US006648042B2

(12) United States Patent
Saito et al.

(10) Patent No.: US 6,648,042 B2
(45) Date of Patent: Nov. 18, 2003

(54) LOAD-APPLYING DEVICE FOR A DOUBLE FACER

(75) Inventors: Hiroshi Saito, Kasugai (JP); Masami Umemura, Kasugai (JP)

(73) Assignee: Kabushiki Kaisha Isowa, Aichi (JP)

( * ) Notice: Subject to any disclaimer, the term of this patent is extended or adjusted under 35 U.S.C. 154(b) by 124 days.

(21) Appl. No.: 09/982,630

(22) Filed: Oct. 18, 2001

(65) Prior Publication Data

US 2002/0043325 A1 Apr. 18, 2002

(51) Int. Cl.[7] ................................................ B32B 31/00

(52) U.S. Cl. ........................ 156/470; 156/205; 156/210; 156/498

(58) Field of Search ................................ 156/205, 210, 156/470, 498, 499, 580, 583.1, 583.5; 100/315, 321, 324, 325, 326

(56) References Cited

U.S. PATENT DOCUMENTS

| | | | | |
|---|---|---|---|---|
| 4,023,481 A | * | 5/1977 | Keeny | 100/93 P |
| 5,788,803 A | * | 8/1998 | Sissons et al. | 156/359 |
| 6,257,296 B1 | * | 7/2001 | Pallas et al. | 156/470 |

* cited by examiner

*Primary Examiner*—James Sells
(74) *Attorney, Agent, or Firm*—Koda & Androlia

(57) ABSTRACT

A load-applying device used in a double facer that manufactures a corrugated board, the load-applying device comprising load bodies that are caused to ride above a corrugated board sheet only by the weight of weight blocks are disposed in a sheet conveying direction and in a direction at right angles of such sheet conveying direction; thus applying a load to the corrugated board sheet and bonding the corrugated board sheet without causing crushing of the corrugated board sheet or faulty bonding.

10 Claims, 19 Drawing Sheets

LOAD-APPLYING DEVICE FOR A DOUBLE FACER

BACKGROUND OF THE INVENTION

1. Field of the Invention

The present invention relates to a load-applying device for a double facer of a corrugator that manufactures corrugated board sheets.

2. Prior Art

In corrugated board sheets, a liner and a core paper are fed out on the upstream side of a corrugator, and after the core paper has been corrugated with a desired flute by a single facer, the core paper is pasted to the liner, thus manufacturing a continuous single-faced corrugated board sheet. Then, as shown in FIG. 19, the single-faced corrugated board sheet and a back liner are pasted together in a double facer 1. Thus, a continuous corrugated board sheet S is formed. Afterward, this sheet is cut and trimmed to desired dimensions by a slitter-scorer and/or cutter (not shown), stacked by a stacker, etc. and then sent to a box-making process or shipping.

As seen from FIG. 19, the double facer 1 is comprised of two sections: a heating section 2 and a cooling section 3.

An upper conveyor belt 4 and a lower conveyor belt 5 which hold and convey the corrugated board sheet S passing through the double facer 1 are provided so as to introduce a single-faced corrugated board sheet conveyed from the upstream side and a liner into the double facer 1, cause the sheet and liner to pass through the double facer 1, and then convey the sheet and liner to a slitter-scorer or cutter (not shown) of a downstream process.

The upper conveyor belt 4 is mounted on a driving roll 6, an introduction roll 7 and tension rolls 8*a* and 8*b*. The driving roll 6 is disposed above the running corrugated board sheet S on the downstream side of the double facer 1. The introduction roll 7 is disposed on the upstream side of the double facer 1. The tension rolls 8*a* and 8*b* are disposed above the double facer 1 at intermediate points in the conveying direction. The upper conveyor belt 4 is driven by the driving roll 6.

The lower conveyor belt 5 is mounted on a driving roll 9, an introduction roll 10 and a tension roll 11. The driving roll 9 is disposed beneath the running corrugated board sheet S on the downstream side of the double facer 1. The introduction roll 10 is disposed on the upstream side of the cooling section 3 at an intermediate point in the conveying direction of the double facer 1. The tension roll 11 is disposed beneath the double facer 1 at an intermediate point (with respect to the conveying direction) between the introduction roll 10 and the driving roll 9. The lower conveyor belt 5 is driven by the driving roll 9.

The upper conveyor belt 4 and the lower conveyor belt 5 are controlled by a driving device (not shown) and a control device (not shown) which controls the driving device, so that the driving rolls 6 and 9 rotate in synchronization with each other.

In the heating section 2 of the double facer 1, a pressing device 12 is disposed above the corrugated board sheet S. Also, a heating device 15 is disposed beneath the corrugated board sheet S.

The pressing device 12 includes a means in which a plurality of weight rolls are disposed in the sheet conveying direction, and pressure is applied to the running corrugated board sheet S via the upper conveyor belt 4 by the weight of the weight rolls. The pressing device 12 further includes a means such as that shown in FIG. 19. In this pressing means, a plurality of devices, in which a plate 14 is driven by a driving member 13 so that pressure is applied to the corrugated board sheet S via the upper conveyor belt 4, are disposed in the sheet conveying direction, and the running corrugated board sheet S is pressed by the pressing force of these pressing devices via the upper conveyor belt 4.

Numerous patent applications have been filed on such pressing means, etc. including, for instance, Japanese Patent Application Laid-Open (Kokai) Nos. 6-328596, 8-109590, and 2000-62055.

In the heating device 15, a plurality of heating plates which are heated by high-temperature steam or heating plates which cause induction heating of the corrugated board sheet by means of induction heating devices, etc., are disposed in the sheet conveying direction. In addition, the single-faced corrugated board sheet and liner that are conveyed from the upstream side are heated by the heating members 16 of the heating device 15 so that the glue is gelled and bonding occurs.

The corrugated board sheet S is formed as a result of the bonding of the single-faced corrugated board sheet and liner by the action of the pressing device 12 and heating device 15. Then, when the corrugated board sheet S has passed through the heating section 2, the sheet S enters the cooling section 3.

In the cooling section 3 of the double facer 1, a plurality of weight rolls 18 of a load-applying device 17 are disposed above the corrugated board sheet S in the sheet conveying direction, and the cooling section 3 is constructed so that the weights of the respective weight rolls 18 are applied to the corrugated board sheet S via the upper conveyor belt 4. A conveying supporting device 19 is comprised of a plurality of conveying rolls 20. The conveying rolls 20 are disposed in the sheet conveying direction beneath the corrugated board sheet S and support the corrugated board sheet S from below.

The heated corrugated board sheet S conveyed from the heating section 2 is held and conveyed by the upper conveyor belt 4 and lower conveyor belt 5. While the corrugated board sheet S passes through the cooling section 3, the corrugated board sheet S is pressed by the weight rolls 18 while being supported by the weight rolls 18 and conveying rolls 20. The final bonding is thus accomplished, and the heated corrugated board sheet S is cooled.

In the load-applying device 17 of the cooling section 3, instead of the weight rolls 18, a means that presses the corrugated board sheet S via the upper conveyor belt 4 using the pressing device disclosed in the above-described Japanese Patent Application Laid-Open (Kokai) No. 6-328596 may be used.

When the corrugated board sheet S has passed through the cooling section 3, the corrugated board sheet S leaves the double facer 1. The corrugated board sheet S is conveyed to a slitter-scorer or cutter (not shown) of a downstream process, and then the sheet is cut and trimmed to a desired size.

In a conventional double facer, the corrugated board sheet S is pressed by weight rolls from above. However, the weight rolls are rotatably shaft-supported on side frames (not shown) of the double facer 1. They are individually adjusted so that the rolls are parallel with respect to the direction of width of the machine, and so that the height between the respective weight rolls is also uniform. Furthermore, the side frames are raised and lowered in accordance with the flute of the corrugated board sheet S that is to be produced. Accordingly, the weight rolls are raised and lowered in accordance with the raising and lowering movements of the side frames, so that the corrugated board sheet S is pressed.

However, the problem is that in regard to the work of attaching these weight rolls to the side frames of the double facer, time and effort are required for assembly. Also the adjustments that are made require experience and are not easily accomplished. Thus, the adjustment work is a burden on the assembly workers.

Furthermore, in recent corrugators, there has been a progressive increase in the size and speed of the machinery, and double facers also have a machine width of 2500 mm to 2800 mm. In addition, high-speed corrugators in which the speed ranges from 350 meters per minute to 400 meters per minute have also appeared. Accordingly, in order to heat-bond and cool the corrugated board sheet by means of a double facer, the double facer itself must be constructed with a long machine length.

When the machine length and machine width of the double facer are thus increased, adjustment of the weight rolls on an individual basis in the sheet conveying direction becomes difficult, and parallel alignment also becomes difficult in mechanical terms. Also, as the length of the machine increases, the height adjustment of the weight rolls, several tens of which may be lined up in the sheet conveying direction, becomes difficult.

As a result of the factors above, it becomes extremely difficult to apply a uniform load to the corrugated board sheet S using weight rolls alone. Accordingly, the raising-and-lowering device must be used to align the weight rolls with the height of the flute of the corrugated board sheet produced, and a load must be applied by adjusting the raising-and-lowering device so that a sufficient load is applied to the corrugated board sheet S.

Since a plurality of weight rolls lined up in the sheet conveying direction show height differences with respect to the corrugated board sheet, weight rolls that apply an excessive load to the corrugated board sheet will crush the corrugated board sheet. Conversely, weight rolls that apply no load to the corrugated board sheet at all cannot apply a sufficient bonding action, resulting in bonding defects occurring in the corrugated board sheet.

Furthermore, since the weight rolls and corrugated board sheet make linear contact in the direction of width, a concentrated load is applied each time that the corrugated board sheet passed directly beneath a weight roll.

In addition, since the core paper of the corrugated board sheet is corrugated, the reaction force caused by the load of the weight rolls varies between the crests of the corrugations and the areas between the crests of the corrugations, so that the weight rolls vibrate in the vertical direction.

In a double facer, a plurality of weight rolls are disposed in the sheet conveying direction. Thus, the weight rolls vibrate in the vertical direction when the corrugated board sheet runs, so that the load of the weight rolls becomes greater than necessary. Also, since the contact is linear contact, the load of the weight rolls is applied to the corrugated board sheet as a linear pressure, thus causing crushing of the corrugations of the corrugated board sheet. Moreover, the weight rolls also show vibration caused by the vertical movement as described above, and noise that is generated by the vibration, etc. The working environment of the operator is thus not desirable.

In addition, in cases where the width of the corrugated board sheet is narrower than the width of the weight rolls, the entire weight of each weight roll is applied to the corrugated board sheet. This results in that crushing of the corrugations may occur when an excessive load is applied to the corrugated board sheet.

Furthermore, another problem that is different from the weight rolls is warping of the corrugated board sheet.

More specifically, as a result of the progressively higher speeds of corrugators in recent years, the corrugated board sheet passes through the double facer at a high speed. In order to achieve reliable bonding of the corrugated board sheet passing through at a high speed, sufficient heating must be performed in the heating section of the double facer. However, as a result of the application of heat to the corrugated board sheet, the moisture contained in the corrugated board sheet evaporates. As a result of the evaporation of the moisture, warping occurs in the corrugated board sheet, thus causing a drop in product quality and resulting in the manufacture of a defective sheet.

In the case of weight rolls, these rolls make linear contact with the corrugated board sheet (although the contact is via the upper conveyor belt), and there are gaps between the weight rolls. The result is that the evaporation of moisture is unavoidable.

Thus, there are various problems in a system that applies a load to the corrugated board sheet by means of weight rolls.

On the other hand, in devices that use the pressing means as disclosed in Japanese Patent Application Laid-Open (Kokai) Nos. 6-328596, 8-109590 and 2000-62055, pressing is performed by means of a pressing force based on a structure that is mechanically adjusted beforehand. However, the structure is complicated, the number of parts required is large and the manufacturing cost is high. Furthermore, once trouble occurs, maintenance is difficult to perform.

Moreover, the pressing forces apply pressure by means of forces that are determined in design terms by mechanically constructed structural bodies and driving bodies such as springs, etc. Accordingly, for example, in cases where it is desired to alter the pressing force, the amount of compression of the springs must be changed by altering the setting of the gap between the pressing devices and the belt. In the case of driving bodies such as springs, for example, the springs must be replaced with springs that have a different spring constant.

However, in order to alter the setting of the gap between the pressing devices and the belt, it is necessary to make the heights of all of the pressing devices uniform using a dimension gauge, etc. This adjustment work requires time and is extremely difficult to perform during ordinary operations. Furthermore, the replacement of even a single spring requires the calculation of the pressing force in the pressing device that accompanies the spring constant of the spring. Moreover, replacement of the pressing device to which the spring is attached, and adjustment work following the replacement, are required. Thus, this work cannot be easily performed by the operator, making it necessary for the replacement to be performed by a designer or worker who has special knowledge, such as a machine maker, etc.

As seen from the above, there have been various problems in systems that apply a load to the corrugated board sheet using pressing means. Furthermore, in a double facer, these problems are common to both the heating section and the cooling section.

SUMMARY OF THE INVENTION

Accordingly, an object of the present invention is to reduce manufacturing costs of corrugated board sheet by means of a simple structure in which maintenance can easily be performed.

Another object of the present invention is to produce a corrugated board sheet with stable quality by way of preventing crushing of the corrugated board sheet caused by a load that is greater than necessary and preventing faulty bonding caused by the failure to apply a load.

A further object of the present invention is to produce a corrugated board sheet with stable quality by way of inhibiting the evaporation of the moisture content and reducing the generation of warping.

The above objects are accomplished by a unique structure for a load-applying device used in a double facer that comprises:

a heating section into which a single-faced corrugated board sheet and a liner sheet are supplied, and glue applied as a coating to the crests of the corrugations of the single-faced corrugated board sheet is hardened so that the single-faced corrugated board sheet and liner sheet are bonded together, and a cooling section which cools the corrugated board sheet and said liner sheet bonded together in the heating section, wherein the load-applying device is comprised of:

a surface pressure applying body which is disposed above the corrugated board sheet so as to face the corrugated board sheet and which applies a surface pressure to the corrugated board sheet, weight blocks which are carried on top of the surface pressure applying body, and load bodies in which one end of the surface pressure applying body is fastened to the double facer, while the other end is caused to ride on the corrugated board sheet in the sheet conveying direction, and wherein a plurality of the load bodies are disposed at right angles with reference to the sheet conveying direction.

The above objects are accomplished by another unique structure of the present invention for a load-applying device used in a double facer that comprises:

a heating section into which a single-faced corrugated board sheet and a liner sheet are supplied, and glue applied as a coating to the corrugation crests of the corrugations of the single-faced corrugated board sheet is hardened so that the single-faced corrugated board sheet and liner sheet are bonded together, and a cooling section which cools the corrugated board sheet bonded in the heating section, wherein the load-applying device is comprised of:

a surface pressure applying body which has connecting sections on the upstream side and downstream side, the surface pressure applying body being disposed above the corrugated board sheet so as to face the corrugated board sheet and applying a surface pressure to the corrugated board sheet, weight blocks which are carried on the surface pressure applying body, and load bodies formed in the form of a chain in which a plurality of the surface pressure applying bodies are disposed in the sheet conveying direction and formed into the form of a chain by being connected at the connecting sections, one end of the surface pressure applying bodies formed into the form of chain being fastened to the double facer, while the other end of the surface pressure applying bodies formed into the form of a chain being caused to ride on the corrugated board sheet in the sheet conveying direction, and wherein a plurality of the load bodies formed into the form of a chain are disposed at right angles with reference to the sheet conveying direction.

Furthermore, the above objects are accomplished by still another unique structure of the present invention for a load-applying device used in a double facer that comprises:

a heating section into which a single-faced corrugated board sheet and a liner sheet are supplied, and glue applied as a coating to the corrugation crests of the corrugations of the single-faced corrugated board sheet is hardened so that the single-faced corrugated board sheet and liner sheet are bonded together, and a cooling section which cools the corrugated board sheet bonded in the heating section, wherein the load-applying device is comprised of:

a surface pressure applying body which is disposed above the corrugated board sheet so as to face the corrugated board sheet, the surface pressure applying body covering the entire surface of the corrugated board sheet in the direction of width and applying a surface pressure to the corrugated board sheet, and weight blocks which are carried on top of the surface pressure applying body, with two or more of these weight blocks being carried at right angles with reference to the sheet conveying direction, and wherein one end of the surface pressure applying body is fastened to the double facer while the other end of the surface pressure applying body is caused to ride on the corrugated board sheet in the sheet conveying direction.

DETAILED DESCRIPTION OF THE INVENTION

Preferred embodiments of the load-applying device for a double facer of the present invention will be described with reference to the accompanying drawings.

Figure 1:
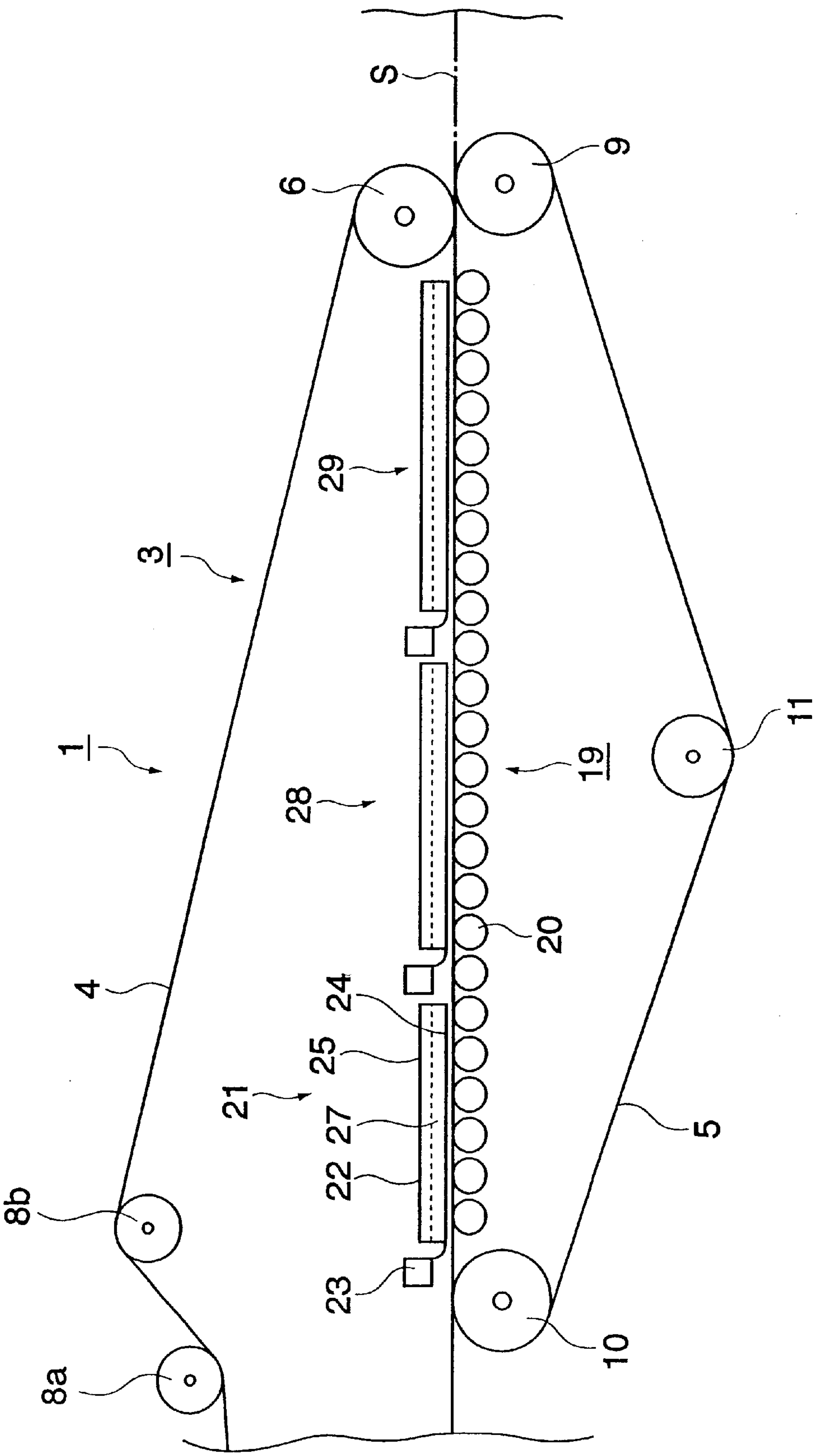
FIG. 1 is a side view of the load-applying device in accordance with one embodiment of the present invention, the load-applying device being used in the cooling section of a double facer.

FIG. 1 is a side view of an embodiment of the present invention in which the load-applying device is installed in a cooling section 3 of a double facer 1. The structure of the double facer other than the load-applying device is substantially the same as that of a conventional double facer. Accordingly, a detailed description thereof is omitted.

In the cooling section 3, load-applying devices 21, 28 and 29 are disposed above the running corrugated board sheet S. It is generally desirable that the load-applying devices be disposed throughout the section in the sheet conveying direction; however, at least one device may be disposed as necessary.

In the embodiment shown in FIG. 1, three load-applying devices 21, 28 and 29 are disposed in the sheet conveying direction. Since the three load-applying devices 21, 28 and 29 shown in FIG. 1 all have the same structure, the load-applying device 21 which is positioned in the furthest upstream portion of the cooling section 3 will be described in further detail below with reference to FIGS. 2 through 10.

In the load-applying device 21, a stay 23 is provided on the frame 30 of the double facer 1 via a supporting member 31 (see FIG. 3 for both); and one end of a surface pressure applying body 24 is fastened to the stay 23 by a fastening member 40 (see FIG. 4), while the other end of the surface pressure applying body 24 is caused to ride on the upper conveyor belt 4 toward the downstream side of the double facer 1. In this case, it is generally desirable that the other end of the surface pressure applying body 24 be left as a free end. However, the other end can be held by a stay on the downstream side either.

Weight blocks 27 are carried on one side of the face pressure applying body 24 which is caused to ride on the upper conveyor belt 4 with one end of the surface pressure applying body 24 being fastened to the stay 23, such one side being an opposite side from the side of the surface pressure applying body 24 that contacts the upper conveyor belt 4.

Figure 2:
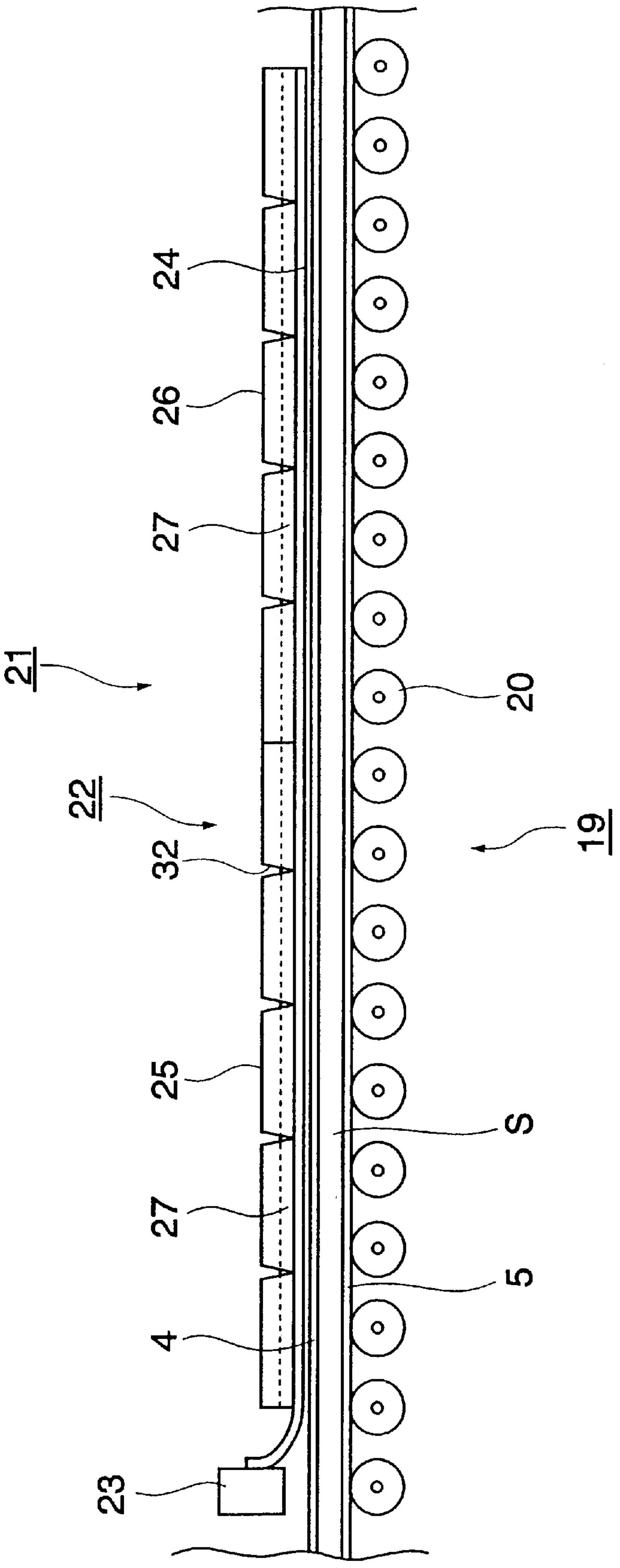
FIG. 2 is a side view of the load-applying device and load bodies of the present invention.

FIG. 2 shows the overall load-applying device 21.

It is sufficient if the surface pressure applying body 24 has a length that allows at least one weight block 27 (described later) to be carried. However, in order to achieve the object of the present invention in a favorable manner, it is desirable to use a surface pressure applying body 24 that has a length that allows a plurality of weight blocks (two or more weight blocks) to be carried.

The surface pressure applying body 24 has a desired thickness. It is sufficient that the thickness allows the transmission of the weight of the weight blocks 27 to the corrugated board sheet S as a surface pressure. If the thickness of the surface pressure applying body 24 is too large, the fit with the running upper conveyor belt 4 is poor, and a desirable surface pressure based on the weight of the weight blocks 27 cannot be obtained.

Accordingly, it is desirable that the surface pressure applying body 24 has a thickness which is such that when the weight blocks 27 are placed on the surface pressure applying body 24, the surface pressure applying body 24 receives the weight of the weight blocks 27 and applies a load to the corrugated board sheet S as a surface pressure while showing a good fit with the upper conveyor belt 4.

As to the material of the surface pressure applying body 24, a material, that reduces the frictional resistance with the upper conveyor belt 4, is resistant to wear caused by friction, and has a good heat resistance, is generally desirable. The main materials used in this case include stainless steel sheets, steel sheets whose surfaces have been plated, hard resin type materials such as Teflon and nylon, etc., fiber type materials such as carbon and fibers, etc., and ceramic materials, etc.

Furthermore, it is also possible to execute a surface treatment, that reduces frictional resistance as in the canvas belt used for the upper conveyor belt 4, on a belt and use such a belt as the surface pressure applying body 24.

The surface pressure applying body 24 that carries the weight blocks 27 of the load body 22 is constructed so that it covers the entire surface of the corrugated board sheet S. Accordingly, there is little escape of moisture even when the corrugated board sheet S is heated by the heating device 15, and thus warping of the corrugated board sheet S tends not to occur.

Figure 3:
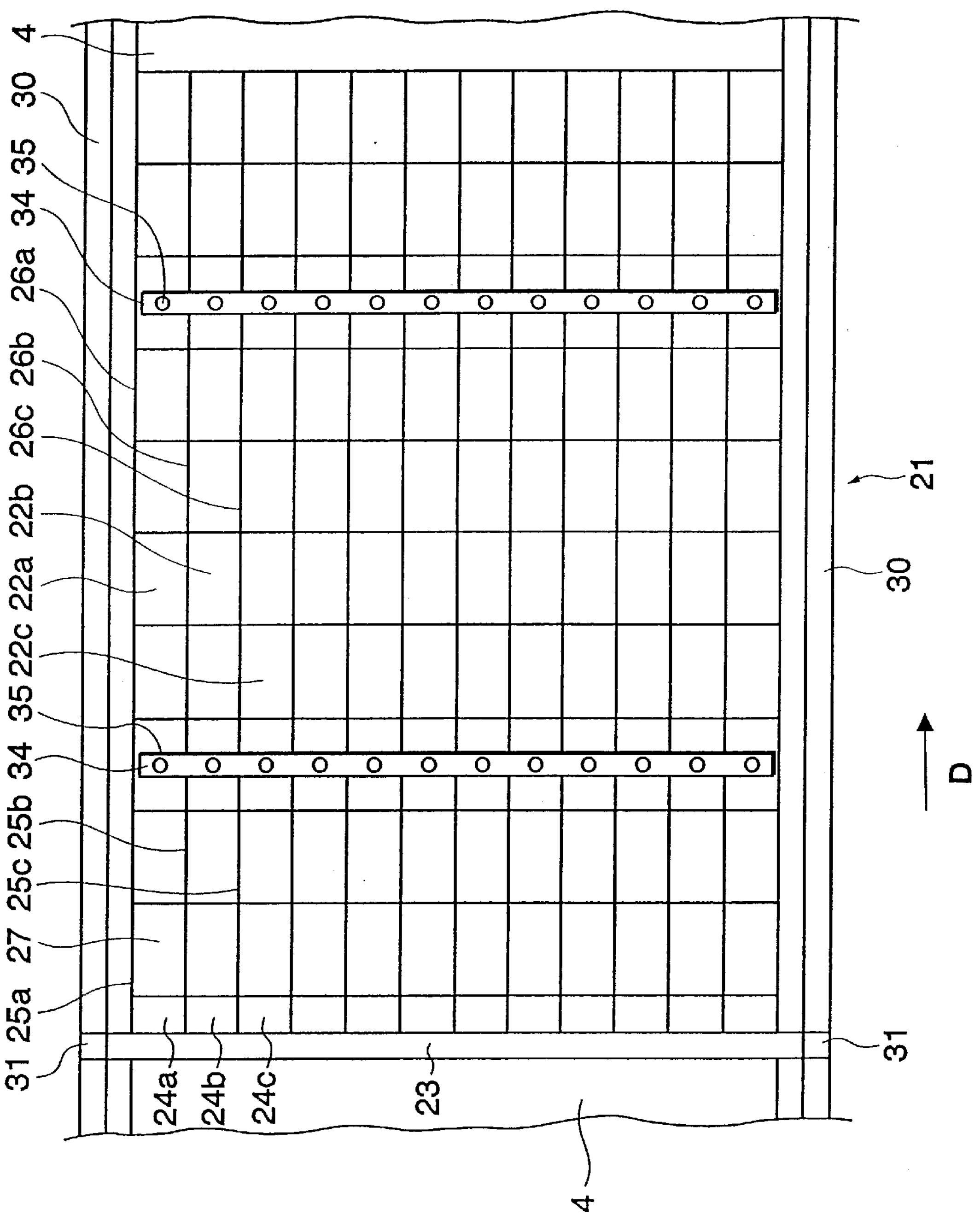
FIG. 3 is a plan view of the load-applying device and load bodies of the present invention.
Figure 4:
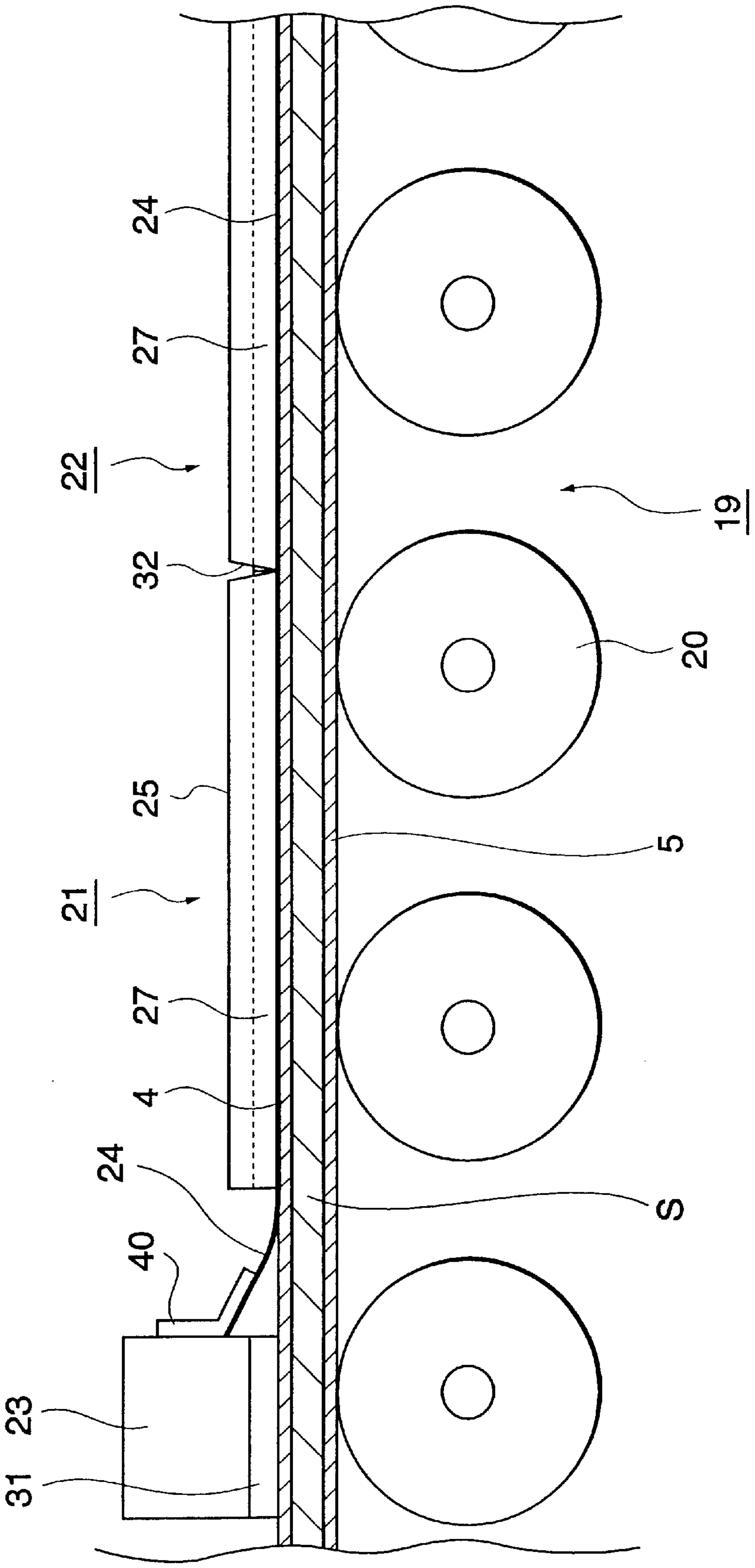
FIG. 4 is a side view of the fastening portion of the load bodies and stay of the present invention.
Figure 7:
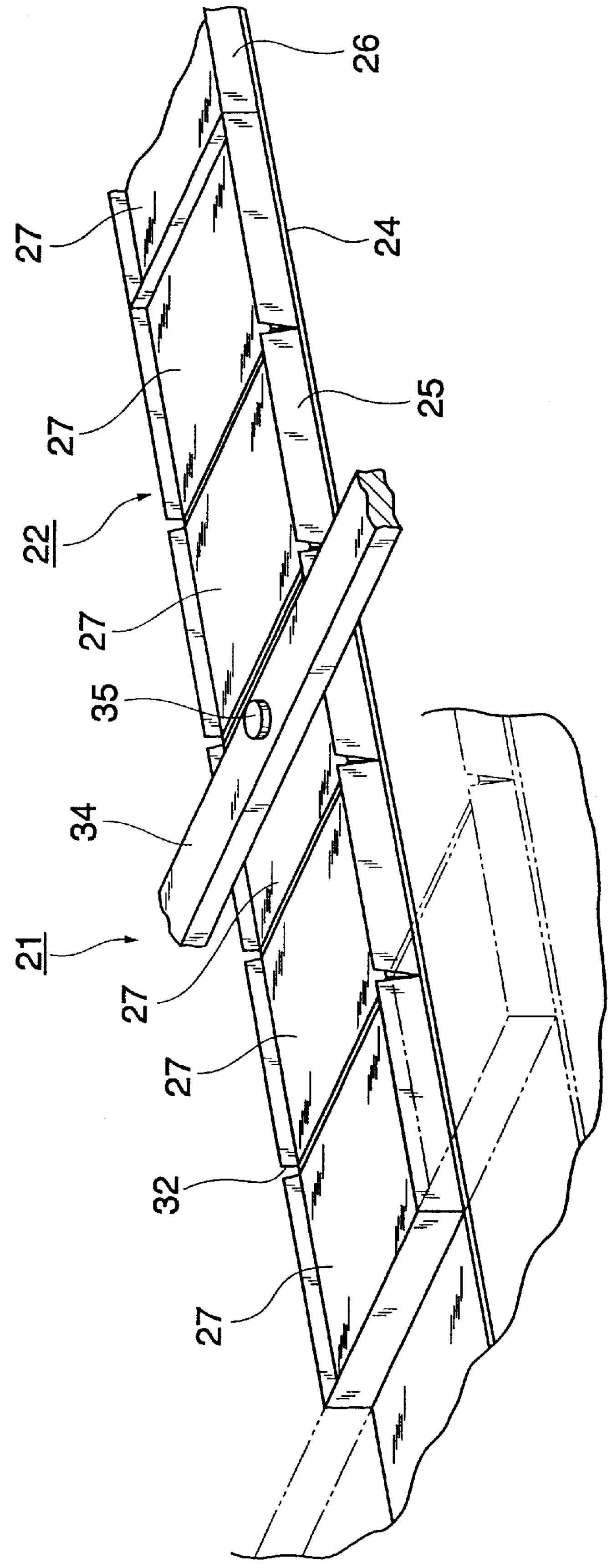
FIG. 7 is a perspective view of the load-applying device and load bodies of the present invention.

As is clear from FIGS. 3 and 7, the weight blocks 27 have a specified length, width and thickness.

Each weight block 27 has a weight that applies a load that is required in absolute terms in order to achieve secure bonding of the corrugated board sheet S that is to be produced. Generally, for example, in cases where a double flute in which the corrugated board sheet is formed from two layers is produced, the required weight is that the load is obtained when a specified number of weight blocks 27 are placed on the surface of the surface pressure applying body 24 so that the load of these weight blocks 27 is applied to the corrugated board sheet S.

In concrete terms, the weight of a single weight block is approximately 100 to 1000 grams.

Furthermore, as long as the above-described purpose is achieved, the weight blocks may be physical objects of any type of structure. The principal physical materials used may be metal substances such as iron, copper or aluminum, etc., resin type substances such as Teflon or nylon, etc., stone type substances obtained by hardening and firing clay, etc., and rubber type substances or ceramic type substances, etc. Plastic type boxes containing water, etc. are also conceivable. However, such plastic type boxes containing water, etc. may be expected to absorb heat from the surface of the heated corrugated board sheet S and radiate this heat upward, etc.

The weight blocks 27 may also be long weight blocks that have approximately the same length as the surface pressure applying body 24.

Each of the weight blocks 27 has a structure which can be simply carried on the upper surface of the surface pressure applying body 24. This is basically most desirable.

However, the weight blocks 27 may also be positioned using an adhesive tape or glue, etc. so that the weight blocks will not fall off of the surface pressure applying body 24.

In the shown embodiment, the weight blocks 27 are lined up in an orderly manner on the surface pressure applying body 24. In order to prevent the weight blocks 27 from falling off of the surface pressure applying body 24, frame-form casings 25 and 26 as shown in FIGS. 2 through 7 are used. The frame-form casings 25 and 26 are slightly larger than the weight blocks 27 and installed in upright positions so as to surround and support the weight blocks 27 on at least three sides above the surface pressure applying body 24. Such three sides include both side surfaces and the downstream side with respect to the sheet conveying direction. The weight blocks 27 are accommodated inside these casings 25 and 26.

It is also possible to use frame-form casings that surround the weight blocks 27 on four sides thereof, so that the upstream sides of the weight blocks 27 in the sheet conveying direction are also supported.

It is further possible to install bottoms on the undersurfaces of the frame-form shapes, so that box-form bodies are formed. These box-form bodies are arranged so that the bottoms are carried on the upper surface of the surface pressure applying body 24. Furthermore, though not shown, it is also possible to use a structural body in which a frame body is installed directly on the surface pressure applying body, so that the structural body has a casing function which allows the surface pressure applying body itself to accommodate the weight blocks.

Cut-outs 32 are formed in the casings 25 and 26 at specified intervals. Since the casings 25 and 26 are structural bodies that surround the weight blocks 27 on three or four sides, the cut-outs 32 are formed so that slack in the surface pressure applying body 24 can be absorbed by the cut-outs 32.

More specifically, the surface pressure applying body 24 is a structural body with a thickness that allows an appropriate fit with the corrugated board sheet S and upper conveyor belt 4. Thus, the slack occurs in the surface pressure applying body 24 when the surface pressure applying body is subjected to a force such as an upward push from the corrugated board sheet S or upper conveyor belt 4, etc. Such a slack is absorbed by the cut-outs 32 formed in the casings 25 and 26.

If the cut-outs 32 are disposed in accordance with the length of the weight blocks 27, then the cut-outs 32 and the connecting joints between the weight blocks 27 will coincide. Accordingly, when slack develops in the surface pressure applying body 24, the slack can be absorbed by the cut-outs 32 and connecting joints between the weight blocks 27 which are disposed in the same positions.

In the shown embodiment, two casings 25 and 26 are disposed on the upstream side and the downstream side of one surface pressure applying body 24, and respective weight blocks 27 are carried inside each of the casings 25 and 26.

Since the weight blocks 27 are merely carried on the surface pressure applying body 24 as described above, these weight blocks can be replaced with weight blocks 27 of a different weight if necessary. In other words, the weight blocks 27 can be replaced in accordance with various production conditions such as the flute that is produced, the paper material, the paper width and the production speed, etc.

Next, the arrangement of installation of the load-applying device 21 in the perpendicular direction or in the right-angle direction with reference to the sheet conveying direction will be described.

As is clear from FIGS. 3 and 7, a plurality of load bodies 22 in which weight blocks 27 are carried on surface pressure applying bodies 24 are lined up at right angles with reference to the sheet conveying direction shown by an arrow D, thus forming one load-applying device. The width of a single load body 22 is determined by the widths of the plurality of weight blocks 27 that are carried on the surface pressure body 24 in the direction perpendicular to the sheet conveying direction D (see FIG. 3) or in the direction of width of the machine. The size of the single load-applying device 21 in the direction of width of the machine is determined by the load-applying device structured by lining up the weight blocks 27 in the direction of width of the machine or in the perpendicular direction with reference to the sheet conveying direction.

The load-applying device 21 applies a load to the corrugated board sheet S from above with the upper conveyor belt 4 in between. Moreover, the load-applying device 21 is set so that both ends of the corrugated board sheet S are always pressed regardless of the paper width of the corrugated board sheet S that is being produced. In other words, the load-applying device is set so that the ends of the corrugated board sheet S are not positioned between adjacent load bodies 22.

Figure 8:
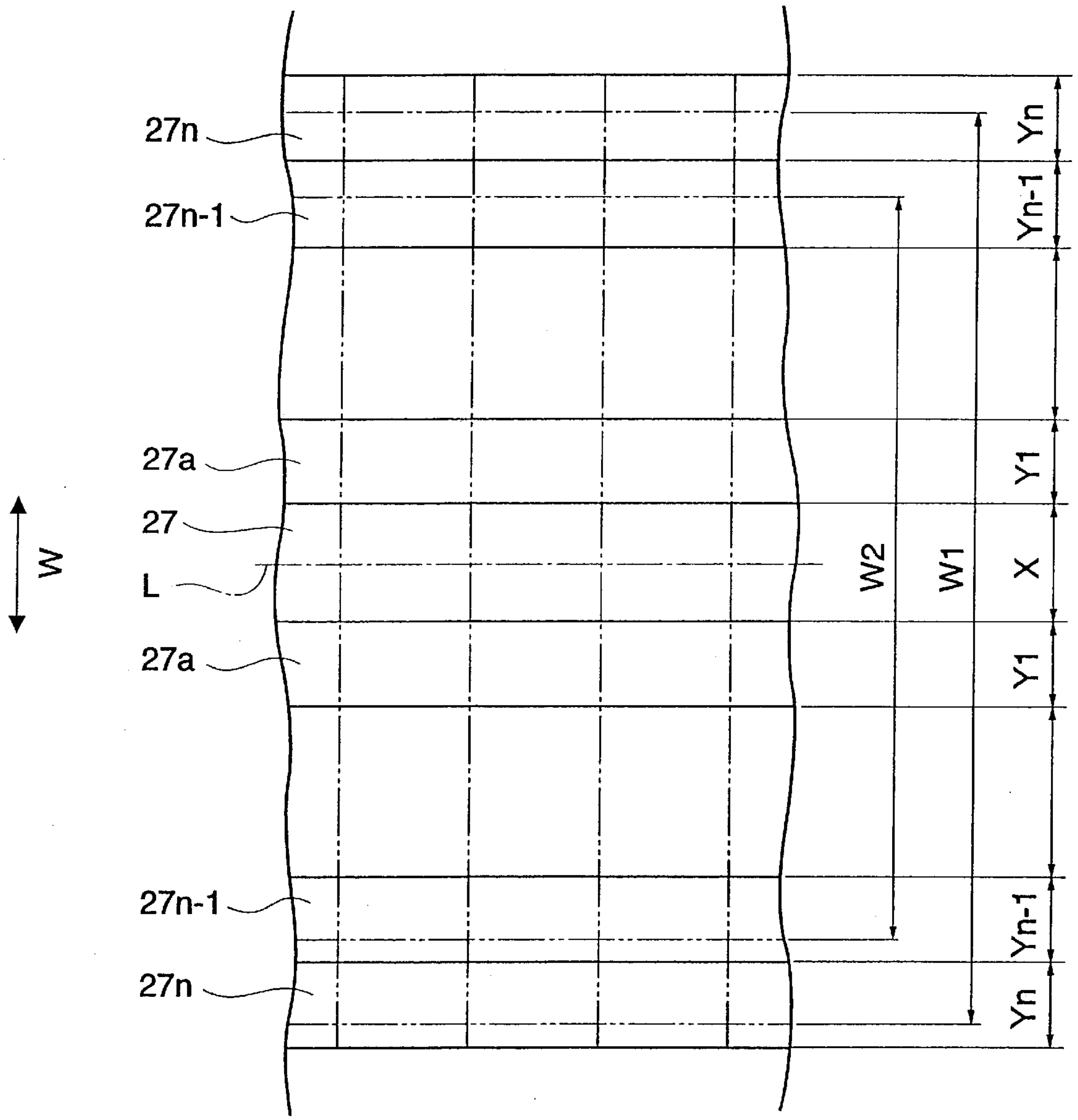
FIG. 8 is a plan view showing the relationship between the weight blocks and the corrugated board sheet in the perpendicular direction with reference to the sheet conveying direction.

Generally, corrugated board sheets are produced using a paper width with a pitch of 50 mm. Accordingly, as shown in FIG. 8, a weight block 27 with a width of e.g. 75 mm is placed in the center L with respect to the direction of width W (see FIG. 8) of the machine as seen from FIG. 8. Also, weight blocs 27 which all have a width of 50 mm are placed on both sides of the center weight block 27. Thus, the ends of the corrugated board sheet that is being produced are not positioned between adjacent load bodies 22.

More specifically, in FIG. 8, X indicates a weight block which has a width of 75 mm, and weight blocks with a width of 50 mm indicated by Y are placed on both sides of the weight block X. In this case, when a corrugated board sheet S with a paper width WI of 2000 mm is passed through and produced in FIG. 8, the distance of both ends of the corrugated board sheet S from the center L with respect to the direction of width W of the machine is 1000 mm. Accordingly, since both ends of the Yn-th weight blocks 27 are located at a distance of 1037.5 mm from the center L with respect to the direction of width of the machine, a difference of 37.5 mm is generated.

On the other hand, when a corrugated board sheet S with a paper width W2 is passed through and produced, both ends of the corrugated board sheet S are located at a distance of 975 mm from the center L with respect to the direction of width W of the machine; accordingly, both ends of the Yn−1-th weight blocks 27 are located at a distance of 987.5 mm from the center L with respect to the direction of width W of the machine. Thus, a difference of 12.5 mm is generated.

If the setting is made as described above, then in cases where a corrugated board sheet is produced using a paper width with a pitch of 50 mm, both ends of the corrugated board sheet S will always pass through within the widths of the weight blocks of the respective load bodies 22 in the sheet conveying direction. Thus, both end portions of the corrugated board sheet S will always be loaded by the load bodies 22.

However, if the load bodies 22 are disposed with weight blocks 27 lined up in the same positions in the sheet conveying direction, unloaded regions in which no load at all is applied to the corrugated board sheet S while the corrugated board sheet 21 passes through the load-applying device 21 are generated between adjacent load bodies 22. Thus, faulty bonding results.

Figure 10:
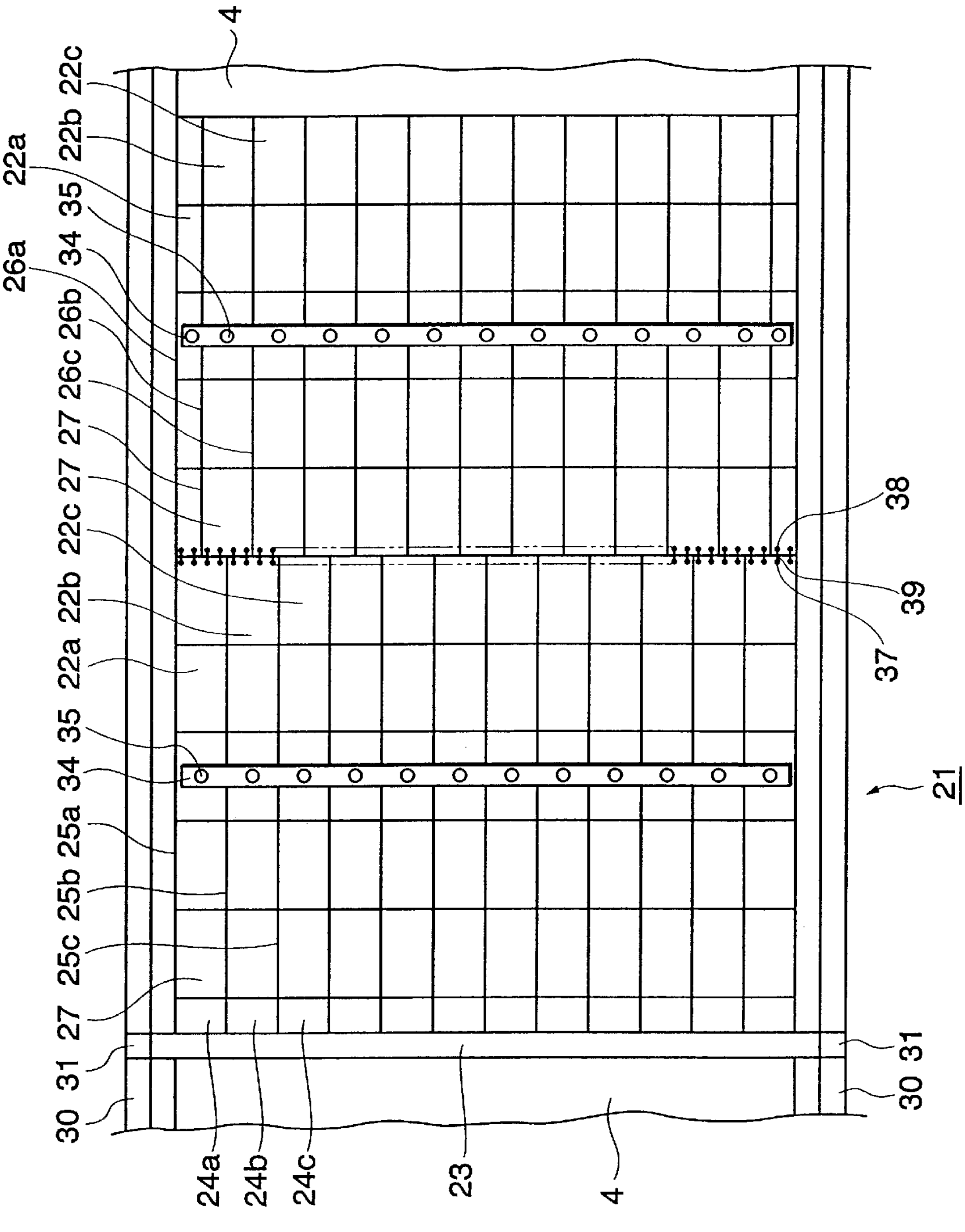
FIG. 10 is a plan view of an embodiment of the present invention in which the load bodies are staggered.

In order to counter this, the load bodies 22*a*, 22*b*, 22*c* and so on are disposed so that the arrangement of the weight blocks 27 is staggered between the upstream side and the downstream side of one load-applying device 21 as shown in FIG. 10.

More specifically, the load bodies 22*a*, 22*b*, 22*c* and so on which are on the downstream side are disposed so as to be shifted by one-half the dimension of one load body 22 in the direction of width of the sheet relative to the load bodies 22*a*, 22*b*, 22*c* and so on disposed on the upstream side. In the upstream-side load bodies and downstream-side load bodies, respective pins 37 and 38 are installed on the downstream ends of the upstream-side load bodies and the upstream ends of the downstream-side load bodies. These pins 37 and 38 are fastened and connected to each other by fastening members 39.

As a result of this arrangement, a load is always applied across the entire surface of the running corrugated board sheet in the direction of width of the sheet.

Figure 9:
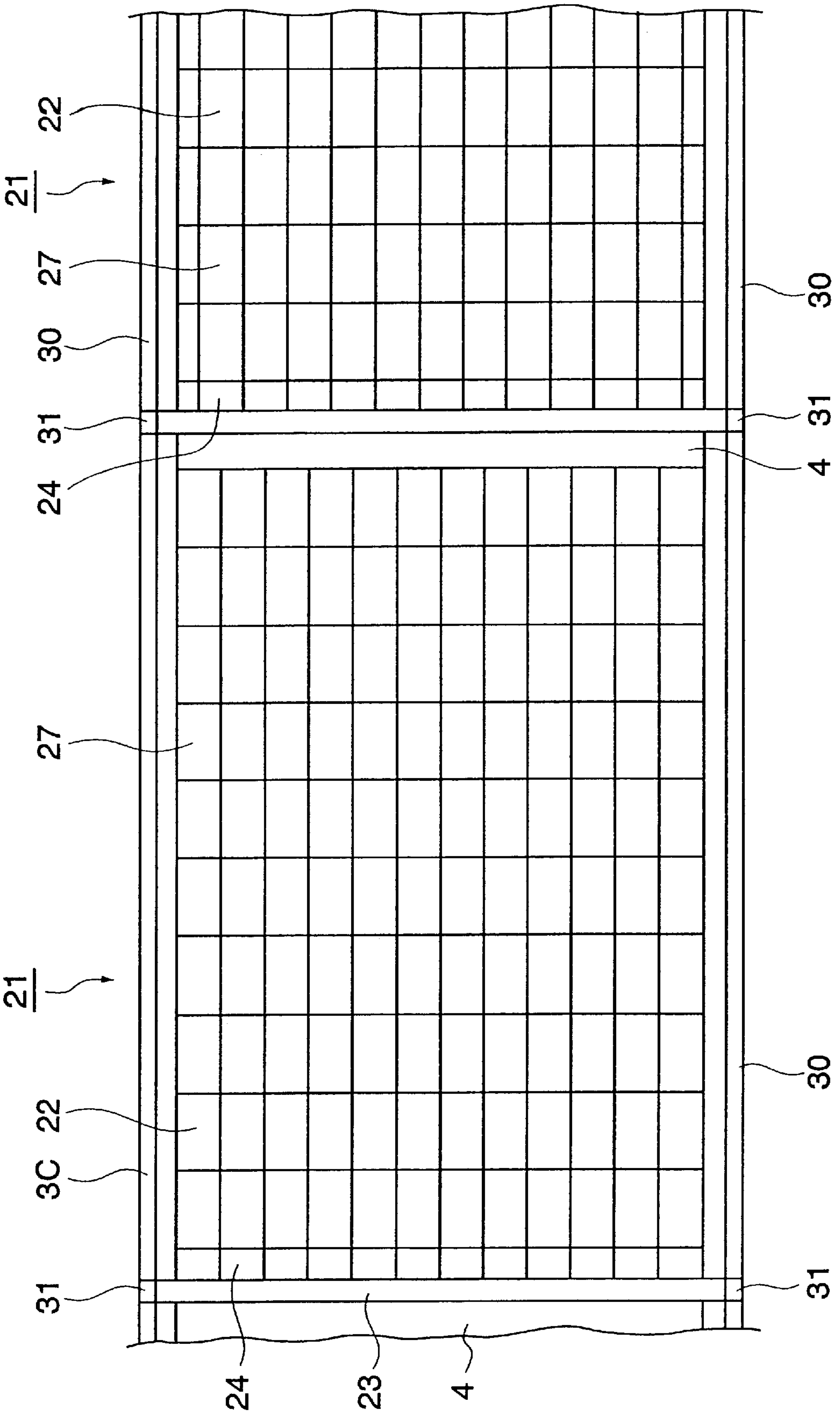
FIG. 9 is a plan view of an embodiment of the present invention in which the weight blocks are disposed so as to be staggered between the load-applying devices in the sheet conveying direction.

In FIG. 10, the load bodies 22 are staggered on the upstream side and downstream side within a single load-applying device 21. However, it is also possible to arrange the load-applying devices 21, 28 and 29 shown in FIG. 1 so that these load-applying devices are respectively staggered as shown in FIG. 9 or to use a combination of the two configurations described above.

Next, the connection of the load bodies 22 in the sheet conveying direction shown in FIG. 5 will be described.

Each load body 22 is structured with the downstream side of the corresponding surface pressure applying body 24 left as a free end in the sheet conveying direction, and the upstream side of the surface pressure applying body 24 is fastened in place and allowed to ride. However, in the double facer 1, the corrugated board sheet S and upper conveyor belt 4 may meander in the sheet conveying direction in some cases. Since the downstream ends of the respective load-applying devices are free ends, meandering of the corrugated board sheet S and upper conveyor belt 4 in the direction of the width of the machine results in the respective load bodies 22 being caught by the meandering so that the load bodies 22 also meander. If this condition worsens, adjacent load bodies 22 may undergo repeated impacts with each other, so that there is a danger that trouble such as one load body riding up over another load body, etc. may occur.

Figure 5:
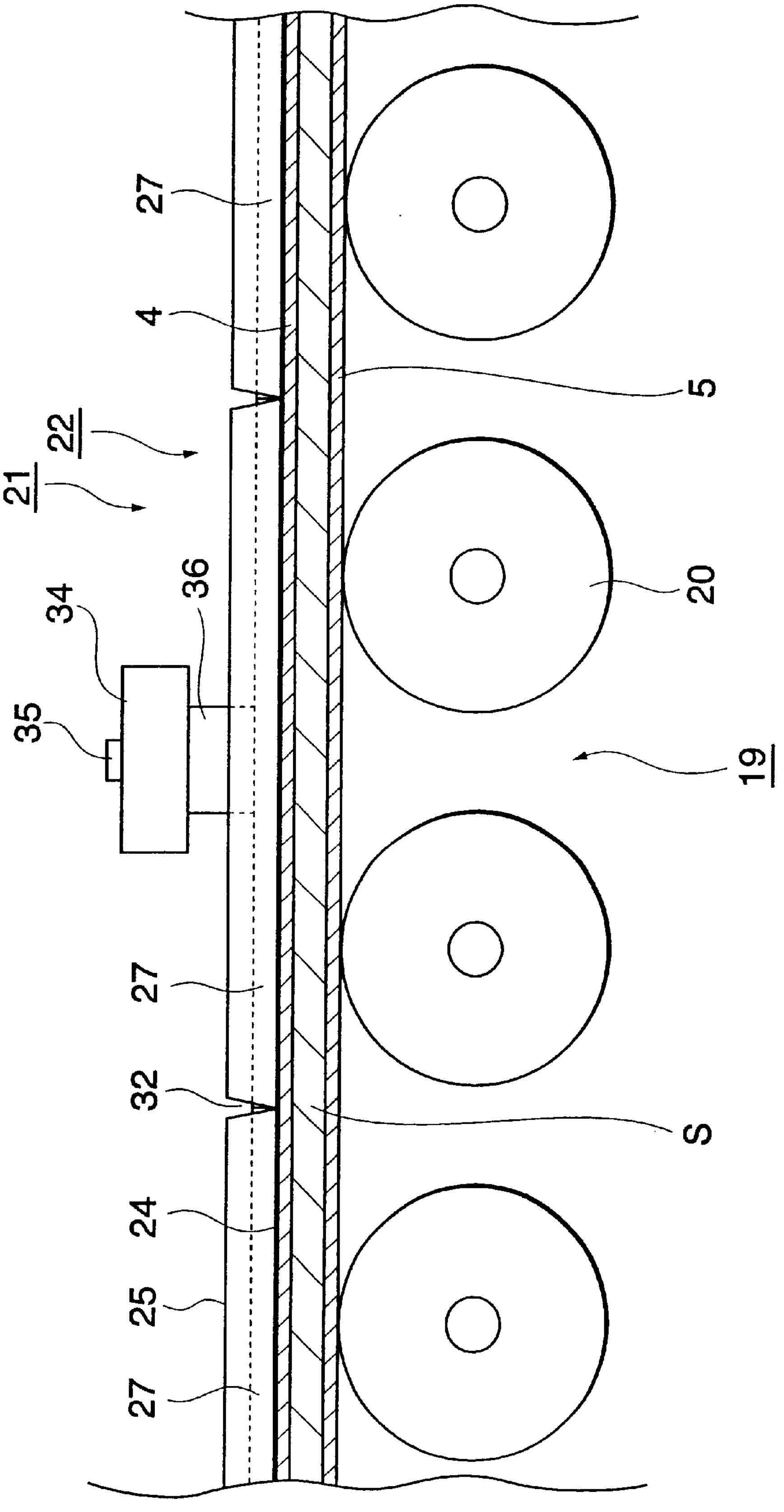
FIG. 5 is a side view of the connecting members of the load bodies.

In order to prevent this trouble, the load bodies 22 are connected in the sheet conveying direction as shown in FIG. 5, so that the load bodies 22 do not meander. More specifically, for example, spacers 36 are installed above the weight blocks 27, and connecting members 34 are installed above in the sheet conveying direction via these spacers 36, and these spacers 36 and the respective weight blocks 27 are fastened together by means of anchoring members 35. As a result, meandering of the respective load bodies 22 can be prevented.

In FIG. 3, the connecting member 35 is disposed in the central portion of the load-applying device 21. However, the connecting member 35 may be disposed in any position from the upstream side to the downstream side of the load-applying device 21. Though not shown, a means in which adjacent casings are fastened to each other can be used as another method of preventing meandering of the respective load bodies 22.

Figure 6:
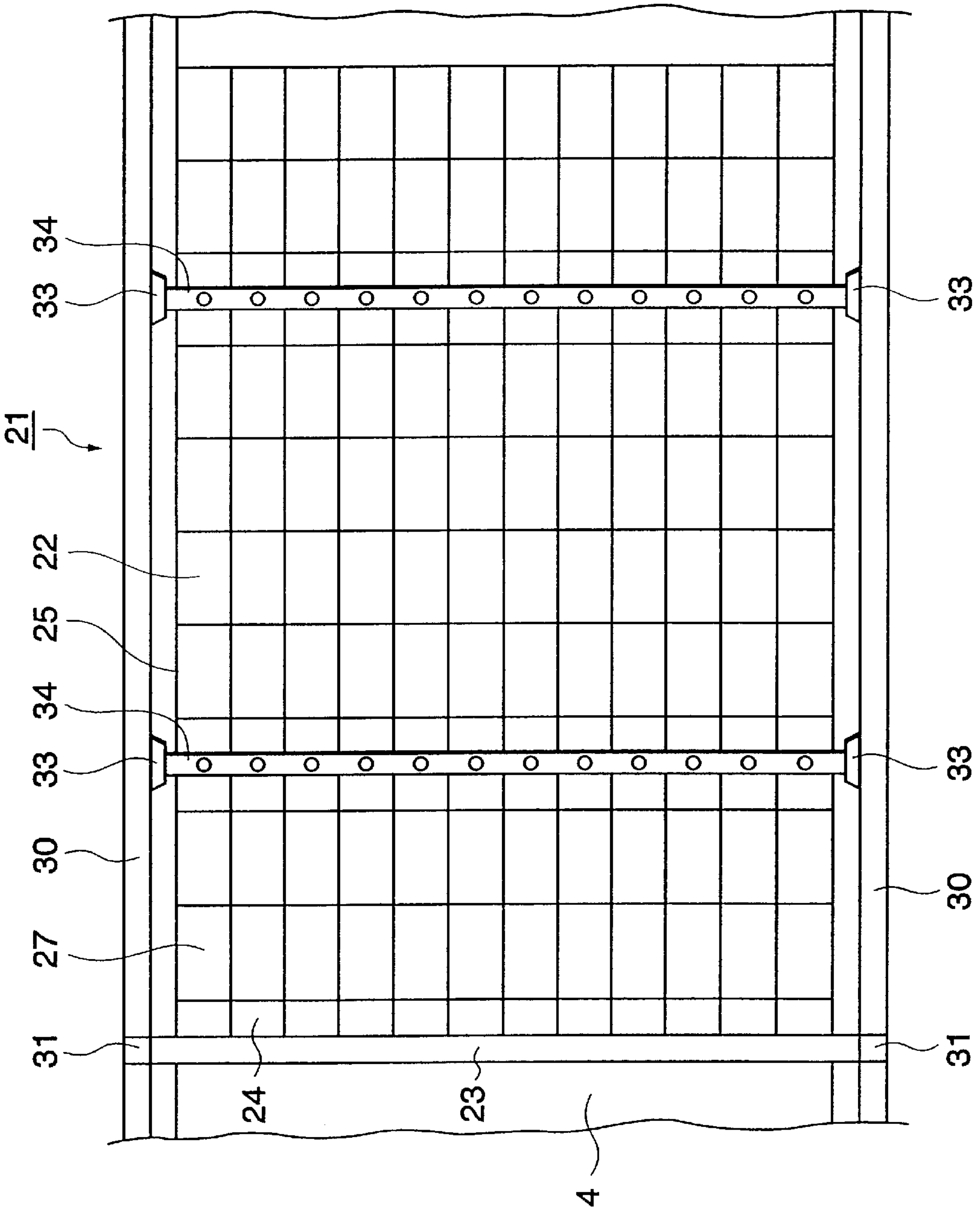
FIG. 6 is a plan view of the side guides of the load bodies.

In order to prevent the load bodies 22 as a whole from meandering in the direction of the width of the machine by connecting the load bodies 22 with connecting members 34, it is also possible to attach side guides 33 to the frame 30 of the double facer 1. The connecting members 34 are caused to contact the side guides 33 so that the sides (with respect to the direction of width of the machine) of the connecting members 34 that connect the load bodies 22 are regulated as shown in FIG. 6.

As described above, the load-applying device 21 comprised of the respective load bodies 22 is caused to ride only by the weight of the weight blocks 27 on a stay 23 which is supported on the frame 30 of the double facer 1 by supporting members 31. Accordingly, no fine gap adjustment or height adjustment according to the thickness of the flute, etc. is required.

Next, the use of the preferred embodiment of the present invention will be described with reference to FIG. 1.

The single-faced corrugated board sheet and liner introduced into the double facer 1 by the upper conveyor belt and lower conveyor belt 5 are bonded together by being pressed by the pressing device 12 while being heated by the heating device 15 in the heating section 2 of the double facer 1. Then, when the resulting corrugated board sheet is conveyed into the cooling section 3, the sheet runs through the cooling section 3 while being held by the upper conveyor belt 4 and lower conveyor belt 5.

While the sheet is supported from below by the conveying rolls 20 of the supporting conveying device 19, a load is applied from above by the load-applying devices 21, 28 and 29 via the upper conveyor belt 4. In this case, the corrugated board sheet S is loaded only by the weight of the respective load bodies 22 of the load-applying device 21 based on the weight blocks 27 and surface pressure applying bodies 24. No other load is applied. Accordingly, unnecessarily large pressure such as the pressing force of a pressing device, etc. is not applied.

The respective load bodies 22 are merely caused to ride (by the weight of the weight blocks 27 and surface pressure applying bodies 24 alone) on a stay 23 that is carried on the frame 30 of the double facer 1 via supporting members 31. Thus, there is absolutely no need for fine gap adjustments or height adjustments according to the thickness of the flute. Since there is almost no damage to the running corrugated board sheet S, crushing of the corrugations can be avoided.

Furthermore, the surface pressure applying body 24 of each load body 22 receives the weight of the weight blocks 27, and it applies loads on the corrugated board sheet S with this weight as a surface pressure over the entire surface of the surface pressure applying body 24. Accordingly, no concentrated load caused by the linear pressure of weight rolls, etc. is applied to the corrugated board sheet. In addition, even if the surface pressure applying bodies 24 should receive an upward-pushing force from the corrugated board sheet S or upper conveyor belt 4, this force is received as a surface pressure. Accordingly, no vibration occurs, and therefore no crushing of the corrugated board sheet S due to roll vibration occurs as it is seen in the case of weight rolls.

The respective load bodies 22 apply a uniform load under the same conditions in the sheet conveying direction. Thus, a non-uniform load balance as a result of a failure to maintain a parallel orientation of the rolls does not occur unlike in the case of use of weight rolls.

Moreover, even in cases where the paper width of the corrugated board sheet that is being produced is narrow, only the load of the weight blocks corresponding to the paper width of the corrugated board sheet that is being produced is applied to the corrugated board sheet. Accordingly, there is no application of the full load of weight rolls (as seen in the case of weight rolls), and there is no crushing of the corrugations due to the application of an excessively large load.

Consequently, a corrugated board sheet of uniform quality can be produced with only a uniform and necessary load being applied in the sheet conveying direction.

As seen from the above, the load-applying device for a double facer provided of the present invention has an extremely simple and easy design. In other words, the load-applying device is caused to ride only by the weight of weight blocks 27 on a stay 23 which is supported on the frame 30 of the double facer 1 via supporting members 31. Accordingly, complicated mechanism is not required even compared to conventional pressing devices, etc. Thus, the manufacturing cost can be reduced, and there is no need for adjustment of the machinery based on special knowledge or experience.

In addition, setting of the load can be accomplished merely by replacing the weight blocks 27. Thus, the setting can be simply accomplished with absolutely no need for the replacement of driving members such as springs, etc., and there is no need of setting of the gap between the pressing device and belt.

Moreover, the application of a load to the corrugated board sheet is accomplished by the continuous application of a load in the sheet conveying direction by the load bodies 22 instead of the intermittent application of a load by a pressing device, etc. Accordingly, a good-quality corrugated board sheet that is free of peeling can be produced.

Next, another embodiment of the present invention will be described with reference to FIGS. 11 through 13.

A load-applying device 41 consisting of a plurality of load bodies 42 lined up in the sheet conveying direction is disposed above a corrugated board sheet running through the cooling section 3 of the double facer 1. As seen from FIG. 11, the load bodies 42 of the load-applying device 41 are supported by a stay 46 on the frame 30 of the double facer 1 via supporting members 31 as in the above-described embodiment.

One end of an assembly of surface pressure applying bodies 44 formed in the form of a connected chain is fastened to the stay 46. In the assembly of surface pressure applying bodies 44, at least two surface pressure applying bodies 44 are connected in the sheet conveying direction by connecting members 43. The other end of the assembly of surface pressure applying bodies 44 is caused to ride on the upper conveyor belt 4 toward the downstream side of the double facer 1. The assembly of the surface pressure applying bodies 44 formed in the form of a connected chain is constructed by connecting at least two surface pressure applying bodies 44. Preferably, however, this assembly is obtained by connecting a plurality of surface pressure applying bodies 44 as shown in FIG. 11, etc. In this case, it is generally desirable that the other end of the assembly of surface pressure applying bodies 44 formed into the form of a connected chain be left as a free end; however, the other end can be held by a stay on the downstream side.

Weight blocks 45 are carried on one side of this assembly of surface pressure applying bodies 44 (which is formed in the form of a connected chain with one end fastened to the stay 46 and the other end caused to ride on the upper conveyor belt 4). Such one side is the opposite side from the side that contacts the upper conveyor belt 4.

The surface pressure applying bodies 44 formed in the form of a connected chain have a specified thickness. This thickness has an effect substantially the same as that described in the previous embodiment. In other words, the thickness transmits the weight of the weight blocks 45 to the corrugated board sheet as a surface pressure and allows the connecting members 43 to be connected.

Furthermore, it is generally desirable that surface pressure applying bodies 44 that are formed in the form of a connected chain is made of a material which reduces the frictional resistance with the upper conveyor belt 4, is resistant to the effects of wear caused by friction, and has a good heat resistance. The main materials used in this case include stainless steel sheets, steel sheets whose surfaces have been plated, hard resin type materials such as Teflon and nylon, etc., fiber type materials such as carbon and fibers, etc., and ceramic materials, etc.

Furthermore, it is also possible to execute a surface treatment, that reduces frictional resistance as in the canvas belt used for the upper conveyor belt 4, on a belt and use such a belt as the surface pressure applying body 44.

Figure 11:
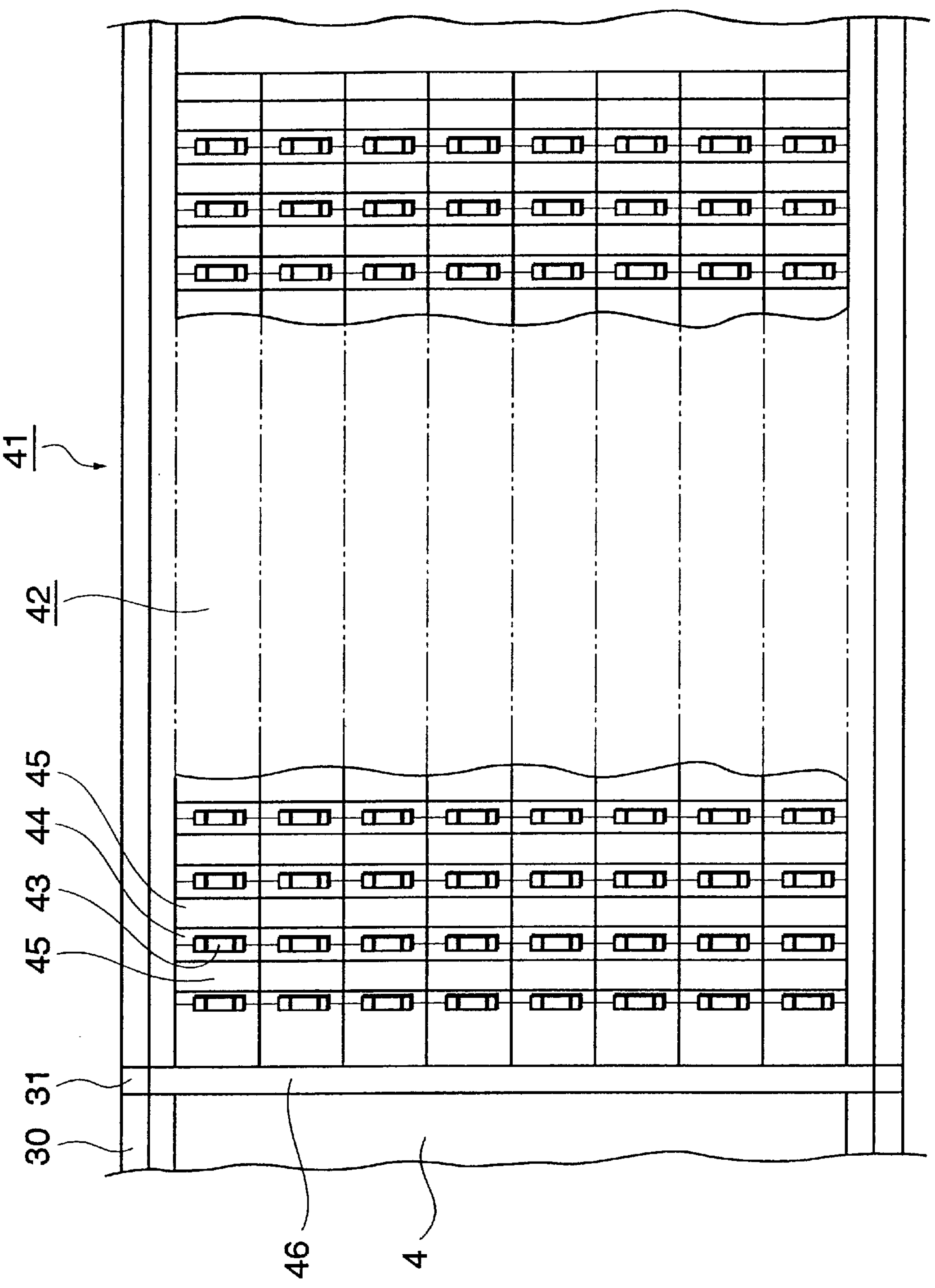
FIG. 11 is a plan view of a load-applying device constructed according to another embodiment of the present invention.
Figure 12:
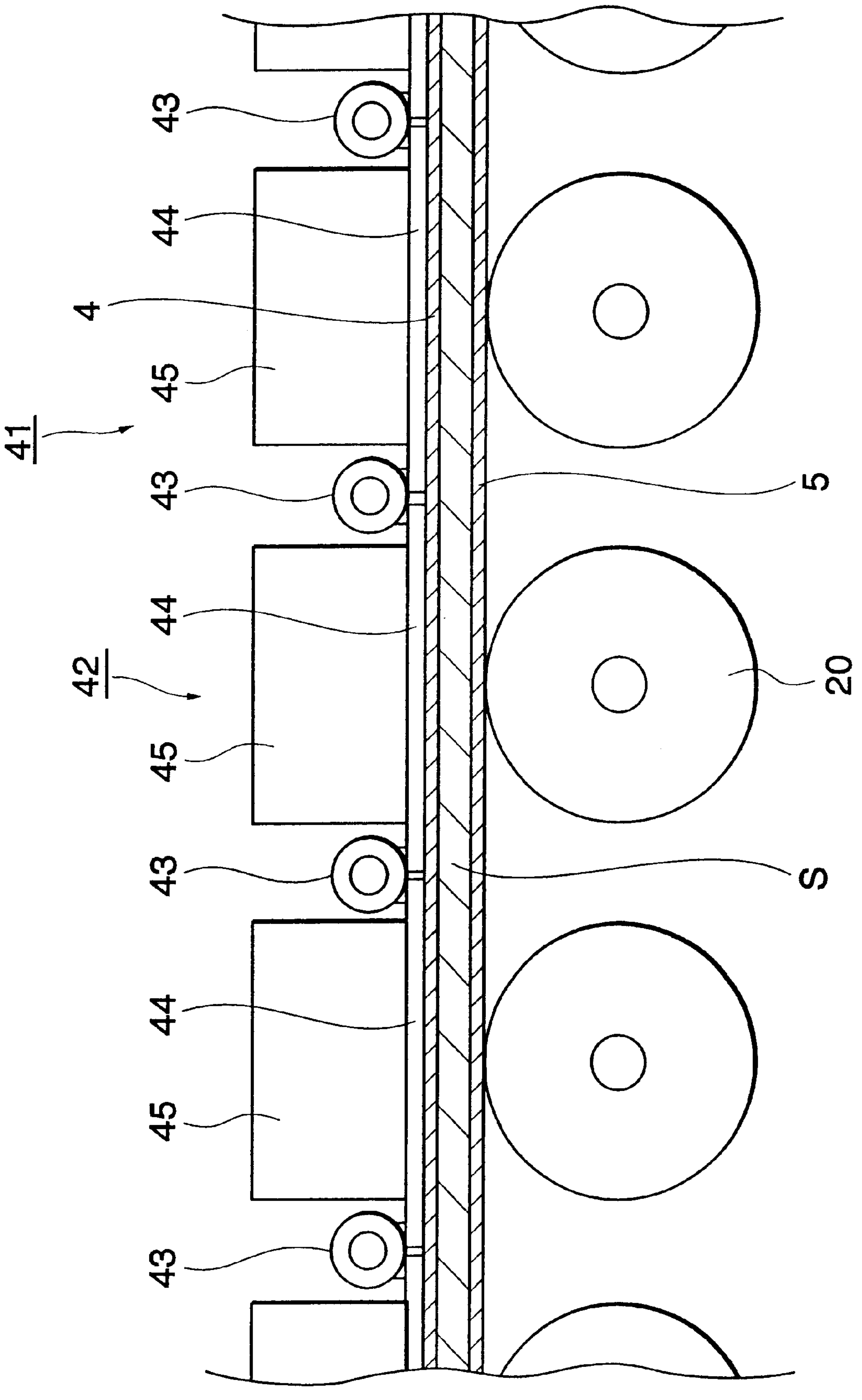
FIG. 12 is a side view of the load bodies constructed according to another embodiment of the present invention.
Figure 13:
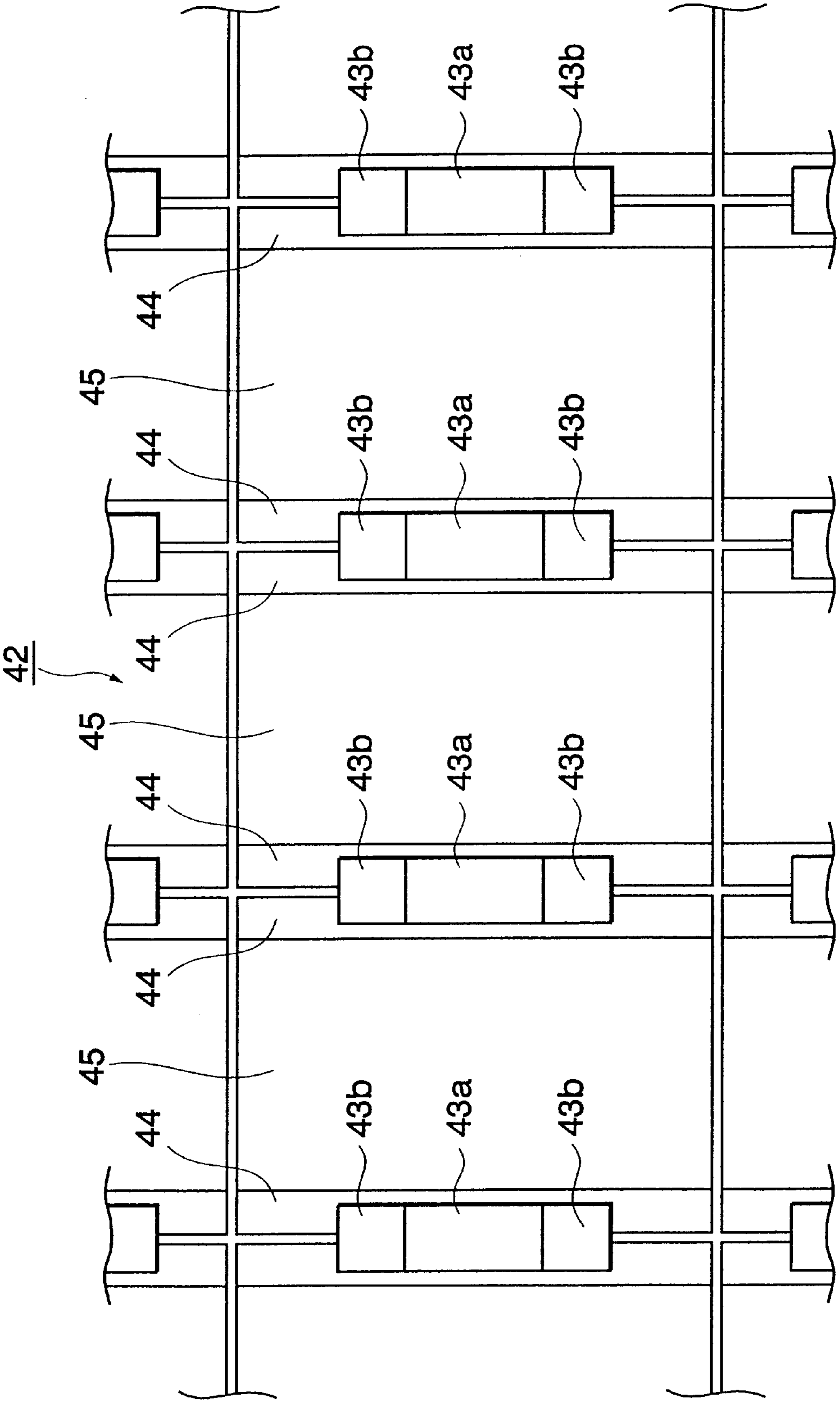
FIG. 13 is a plan view of the load bodies constructed according to another embodiment of the present invention.

As is clear from FIGS. 11 through 13, the weight blocks 45 are members that have a specified length, width and thickness.

The weight, structure and material of the weight blocks 45 are substantially the same as those of the weight blocks 27 in the embodiment described above; accordingly, a detailed description will be omitted here. Furthermore, since the weight blocks 45 are merely carried on the surface pressure applying bodies 44 that are in the form of a connected chain as described above, the weight blocks 45 can be replaced if necessary.

The load bodies 42 as structured above are arranged in the sheet conveying direction as in the embodiment described above. The load bodies 42 form a single load-applying device 41 in the sheet conveying direction, and a plurality of these load-applying devices 41 are disposed in the sheet conveying direction in the cooling section 3 of the double facer 1 in the same manner as described in the above-described embodiment.

In addition, connecting members (not shown), which prevent meandering of the load bodies 42 in the sheet conveying direction, and side guides, which support these connecting members on both sides, etc., are disposed in the same manner as in the above-described embodiment.

Though not shown, the upstream-side and downstream-side load bodies within a single load-applying device 41 can also be constructed with the weight blocks 45 staggered as shown in FIG. 10 for the above-described embodiment, so that unloaded regions are not generated between the respective load bodies 42. It is also possible to arrange so that the weight blocks 45 are staggered in the respective load-applying devices 41 disposed in the sheet conveying direction or to use a combination of these two configurations.

Next, the use of another embodiment comprising the load-applying devices 41 and load bodies 42 will be described.

The single-faced corrugated board sheet and liner introduced into the double facer 1 by the upper conveyor belt and lower conveyor belt 5 are bonded together by being pressed by the pressing device 12 while being heated by the heating device 15 in the heating section 2 of the double facer 1.

Then, when the resulting corrugated board sheet is conveyed into the cooling section 3, the sheet runs through the cooling section 3 while being held by the upper conveyor belt 4 and lower conveyor belt 5. While the sheet is supported from below by the conveying rolls 20 of the supporting conveying device 19, a load is applied from above by the load-applying devices 41 with the upper conveyor belt 4 in between.

In this case, the corrugated board sheet S is given a load only by weight of the weight blocks 45 of the respective load bodies 42 of the load-applying devices 41 and by the weight of the surface pressure applying bodies 44 that are formed into the form of a connected chain. No other load is applied. Accordingly, no unnecessarily large pressure such as the pressing force of a pressing device, etc. is applied.

Furthermore, the respective load bodies 42 are merely caused to ride (by only the weight of the weight blocks 45 and the weight of the surface pressure applying bodies 44 that are formed into the form of a connected chain) on a stay 46 that is carried on the frame 30 of the double facer 1 via supporting members 31. Accordingly, there is absolutely no need for fine gap adjustments or height adjustments according to the thickness of the flute. In addition, since there is almost no damage to the running corrugated board sheet S, crushing of the corrugations does not occur.

Furthermore, the surface pressure applying bodies 44 (formed into the form of a connected chain) of each load body 42 receive the weight of the weight blocks 45, and load the corrugated board sheet S with this weight as a surface pressure over the entire surface of the surface pressure applying bodies 44 (formed into the form of a connected chain). Accordingly, no concentrated load caused by the linear pressure of weight rolls, etc. is applied to the corrugated board sheet.

In particular, the surfaces of the load bodies 42 of the load-applying devices 41 that face the corrugated board sheet in this embodiment are comprised of surface pressure applying bodies 44 that are formed into the form of a connected chain. Thus, even if the surface pressure applying bodies 44 that are thus formed into the form of a connected chain should receive an upward-pushing force from the corrugated board sheet S or upper conveyor belt 4, the upward-pushing force is received as a surface pressure. The upward-pushing force is then absorbed by the connecting members 43. Accordingly, there is no vibration of the load bodies 42; and therefore, no crushing of the corrugated board sheet S due to roll vibration occurs unlike in the case of use of weight rolls.

Furthermore, the respective load bodies 42 apply a uniform load under the same conditions in the sheet conveying direction. Thus, a non-uniform load balance as a result of a failure to maintain a parallel orientation of the rolls occurs as in the case of weight rolls.

Moreover, even in cases where the paper width of the corrugated board sheet that is being produced is narrow, only the load of the weight blocks corresponding to the paper width of the corrugated board sheet that is being produced is applied to the corrugated board sheet. Accordingly, an application of the full load of weight rolls would not occur as seen in the case of use of weight rolls, and there is no crushing of the corrugations due to the application of an excessively large load. Consequently, a corrugated board sheet of uniform quality is produced with only a uniform and necessary load being applied in the sheet conveying direction.

As seen from the above, the load-applying device for a double facer of the present invention has an extremely simple and easy design. In other words, the load-applying device is caused to ride only by the weight of weight blocks 45 and by the weight of surface pressure applying bodies 44 that are in the form of a connected chain on a stay 46 which is supported on the frame 30 of the double facer 1 via supporting members 31. Accordingly, complicated mechanism is not required even compared to conventional pressing devices, etc. Thus, the manufacturing cost can be reduced, and there is no need for adjustment of the machinery based on special knowledge or experience.

In addition, setting of the load can be accomplished merely by replacing the weight blocks 45. Thus, the setting can be simply accomplished with absolutely no need for the replacement of driving members such as springs, etc., and there is no need of setting of the gap between the pressing device and belt.

Moreover, the application of a load to the corrugated board sheet is accomplished by the continuous application of a load in the sheet conveying direction by the load bodies 42 instead of the intermittent application of a load by a pressing device, etc. Accordingly, a good-quality corrugated board sheet that is free of peeling can be produced.

The load-applying devices and load bodies of the present invention can also be used in the heating section 2 of a double facer 1.

In the heating section 2 of the double facer 1, a pressing device is disposed above the paper line of the corrugated board sheet S. The pressing device is comprised of weight rolls or a device in which pressing plates are pressed against the corrugated board sheet by means of a driving device, etc., as described above. However, such weight rolls and pressing devices all suffer from the above-described problems.

As described above, in the load-applying device and load bodies of the present invention the load that is required in absolute terms in order to achieve secure bonding of a corrugated board sheet is applied as a surface pressure. Furthermore, the load-applying device of the present invention has a simple structure in which the load bodies are simply carried by their own weight, and there is absolutely no height adjustment or fine pressure adjustment mechanism for each flute. Thus, there is at least no crushing of the sheet caused by the linear-pressure load and vibration seen in weight rolls, and there is no faulty bonding or bonding imbalance caused by insufficient pressing, etc.

Furthermore, the load-applying device for a double facer of the present invention has an extremely simple and easy structure. More specifically, the load-applying device is caused to ride only by the weight of weight blocks 45 and by the weight of surface pressure applying bodies 44 supported on the frame 30 of the double facer 1 via supporting members 31. Thus, complicated mechanism is not required even compared to conventional pressing devices, etc. Also, the manufacturing cost is reduced, and there is no need for adjustment of the machinery based on special knowledge or experience.

In addition, setting of the load can be accomplished merely by replacing the weight blocks 45. Thus, the setting can be simply accomplished with absolutely no need for the replacement of driving members such as springs, etc., and there is no need of setting of the gap between the pressing device and belt.

Moreover, the application of a load to the corrugated board sheet is accomplished by the continuous application of a load in the sheet conveying direction by the load bodies 42 instead of the intermittent application of a load by a pressing device, etc. Accordingly, a good-quality corrugated board sheet with no peeling of the sheet can be produced.

Figure 14:
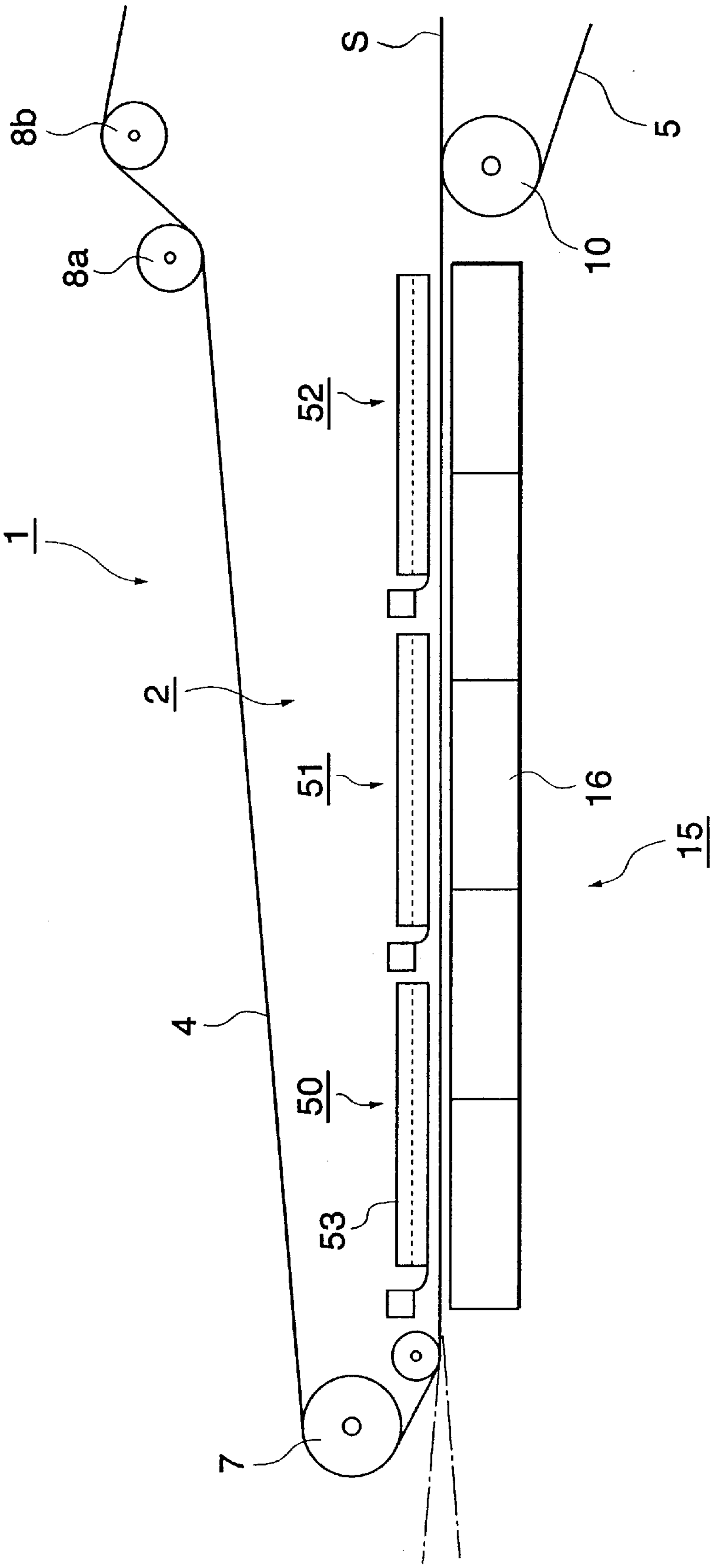
FIG. 14 is a side view of an embodiment of the present invention in which the load-applying device is used in the heating section of a double facer.

In the embodiment in which the load-applying device and load bodies of the present invention are used in the heating section 2 of a double facer 1, as shown in FIG. 14, load-applying devices 50, 51 and 52 are disposed above the running corrugated board sheet S. In the heating section 2, it is desirable that load-applying devices be disposed over the entire surface in the sheet conveying direction. However, it is sufficient to install at least one load-applying device in the sheet conveying direction.

In the embodiment shown in FIG. 14, three load-applying devices 50, 51 and 52 which have the same mechanism are disposed in the sheet conveying direction.

The three load-applying devices 50, 51 and 52 shown in FIG. 14 basically have the same structure as the load-applying device 21 and load bodies 22 used in the cleaning section 3. Accordingly, a detail description will be omitted, and a brief description thereof will be given below.

Figure 15:
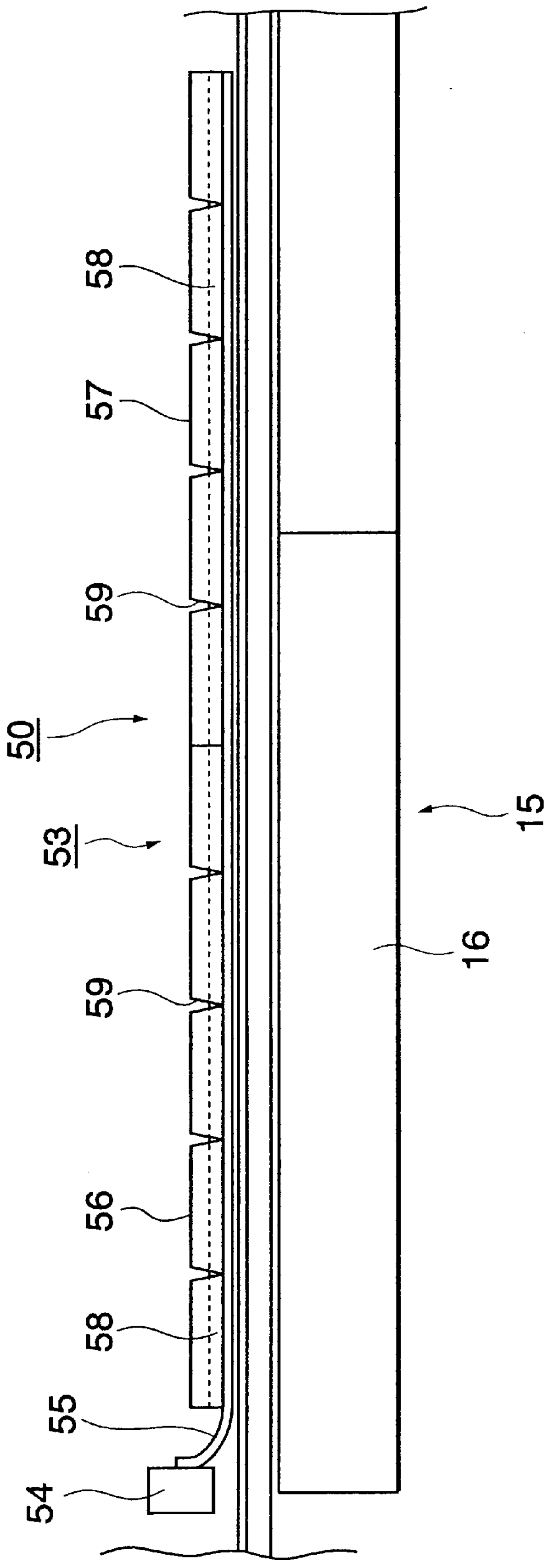
FIG. 15 is a side view of the load-applying device and load bodies shown in FIG. 14.

As a typical example, the structure of the load-applying device 50 disposed on the furthest upstream side of the heating section 2 will be described. In the load-applying device 50, as shown in FIG. 15, a plurality of load bodies 53 are disposed in the sheet conveying direction and form a single load-applying device.

The load bodies 53 of the load-applying device 50 are supported on a stay 54 of the frame 30 of the double facer 1 via supporting members 31. In each load body 53, one end of a surface pressure applying body 55 is fastened to the stay 54, while the other end of the surface pressure applying body 55 is caused to ride on the upper conveyor belt 4 toward the downstream side of the double facer 1. It is generally desirable that the other end of the surface pressure applying body 55 be left as a free end. However, the other end may also be held by a stay on the downstream side.

Furthermore, weight blocks 58 are disposed inside frame bodies 56 and 57 that are on one side of each surface pressure applying body 55 which is caused to ride on the upper conveyor belt 4 with one end fastened to the stay 54. Such one side is opposite from the side that contacts the upper conveyor belt 4.

The thickness and material of the surface pressure applying bodies 55 may be the same as those of the surface pressure applying bodies 24 and 44 used in the cooling section 3. The heating device 15 is disposed beneath the running corrugated board sheet S in the case of the surface pressure applying bodies 55 used in the heating section 2. Accordingly, a material which has a greater heat resistance than the material of the surface pressure applying bodies used in the cooling section 3 is required.

The structure, material and weight of the weight blocks 58 are the same as those of the weight blocks 27 used in the cooling section 3 may be used. However, the heating device 15 is disposed beneath the running corrugated board sheet S in the case of the weight blocks 58 used in the heating section 2. Accordingly, a material that has a greater heat resistance than the material of the weight blocks 27 used in the cooling section 3 is required.

Furthermore, in regard to the installation of the weight blocks 58 to the surface pressure applying bodies 55, the weight blocks 58 are simply carried on the surface pressure applying bodies 55; and this is most desirable. However, it is also possible to mount the weight blocks 58 using an adhesive tape, glue, etc., so that the weight blocks 58 do not fall off of the surface pressure applying bodies 55.

In the present embodiment, thus the weight blocks 58 are lined up in an orderly manner on the surface pressure applying bodies 55. Also, casings 56 and 57 which accommodate the weight blocks 58 are disposed above the surface pressure applying bodies 55 so that the weight blocks 58 do not fall off. The casings 56 and 57 have the same structure as the casings 25 and 26 used in the cooling section 3. Furthermore, though not shown, it is also possible to use structural bodies in which frame bodies are directly formed in an upright position on the surface pressure applying bodies, so that the surface pressure applying bodies themselves function as casings that can accommodate the weight blocks.

Since the weight blocks 58 are merely carried on the surface pressure applying bodies 55, the weight blocks 58 can be replaced upon necessity.

Furthermore, a plurality of load bodies 53 are disposed in the sheet conveying direction and form a single load-applying device 50, and these load bodies 53 apply load on the corrugated board sheet S from above with the upper conveyor belt 4 in between. As in the above-described embodiments, the load bodies 53 are set in accordance with the paper width of the corrugated board sheet S. Also, the two ends (with respect to the direction of width of the sheet) of the corrugated board sheet S that is being produced are never positioned between adjacent load bodies 53.

It is also possible to dispose the load bodies 53 and load-applying device 50 so that these elements are staggered with respect to the sheet conveying direction as in the above-described embodiments. Moreover, in regard to connecting members used to prevent meandering and the prevention of meandering of the load bodies as a whole, meandering can be prevented by connecting the respective load bodies 53 and supporting the sides of the connecting members in the same manner as in the above-described embodiments.

As described above, the load-applying device 50 comprised of the respective load bodies 53 of the present invention is caused to ride by the weight of the weight blocks 58 and by the weight of the surface pressure applying bodies 55 alone on a stay 54 which is supported on the frame 30 of the double facer 1 via supporting members 31. Accordingly, complicated mechanism is not required even compared to conventional pressing devices, etc. Consequently, the manufacturing cost can be reduced, and there is no need for adjustment of the machinery based on special knowledge or experience.

In addition, setting of the load can be accomplished merely by replacing the weight blocks 58. Thus, the setting can be simply accomplished with absolutely no need for the replacement of driving members such as springs, etc., and there is no need of setting of the gap between the pressing device and belt.

Moreover, the application of a load to the corrugated board sheet is accomplished by the continuous application of a load in the sheet conveying direction by the load bodies 53 instead of the intermittent application of a load by a pressing device, etc. Accordingly, a good-quality corrugated board sheet having no peeling of the sheet can be produced.

Next, the use of a preferred embodiment in which the device of the present invention is used in the heating section 2 of a double facer 1 will be described with reference to FIGS. 14 and 15.

The single-faced corrugated board sheet and the liner are conveyed from the upstream side of the double facer 1 and introduced into the heating section 2 by the upper conveyor belt 4 and lower conveyor belt 5. In the heating section 2, the corrugated board sheet S is heated from below by the heating device 15 and is applied with load from above by the load-applying device 50 so that the sheet and the liner are bonded.

In the load-applying device 50, the respective load bodies 56 apply load to the corrugated board sheet S only by the weight of the weight blocks 58 and by the weight of the surface pressure applying bodies 55, and no other load is applied. Accordingly, unnecessarily large pressure such as the pressing force of a pressing device, etc. is not applied.

Furthermore, the respective load bodies 53 are merely caused to ride by the weight of the weight blocks 58 and by the weight of the surface pressure applying bodies 55 on a stay 54 that is carried on the frame 30 of the double facer 1 via supporting members 31. Accordingly, there is absolutely no need for fine gap adjustments or height adjustments that would be required by the thickness of the flute. Since there is thus almost no damage to the running corrugated board sheet S, crushing of the corrugations does not occur.

Furthermore, the surface pressure applying body 55 of each load body 53 receives the weight of the weight blocks 58; and using its entire surface, the surface pressure applying body 55 applies load to the corrugated board sheet S with such weight as a surface pressure. Accordingly, no concentrated load caused by the linear pressure of weight rolls, etc. is applied to the corrugated board sheet. Even if the surface pressure applying bodies 55 should receive an upward-pushing force from the corrugated board sheet S or upper conveyor belt 4, this force is received as a surface pressure. Accordingly, there is no vibration; and therefore no crushing of the corrugated board sheet S due to roll vibration occurs as seen in the case of weight rolls.

Furthermore, the respective load bodies 53 apply a uniform load under the same conditions in the sheet conveying direction. Thus, a non-uniform load balance as a result of a failure to maintain a parallel orientation of the rolls does not occur unlike in the case of use of weight rolls. Accordingly, a corrugated board sheet of uniform quality is produced at a uniform and minimum required load in the sheet conveying direction.

Though not shown and not described in detail, load bodies and a load-applying device of the same structure as the load-applying device 41, which is comprised of the load bodies 42 constructed according to the embodiment of FIGS. 11 through 13, may be used in the heating section 2.

Next, a modification of the surface pressure applying body will be described.

The surface pressure applying bodies 24, 44 and 55 described above in the load-applying devices 21, 41 and 50 are all split in the sheet conveying direction, and weight blocks 27, 45 and 58 are disposed on the respective surface pressure applying bodies 24, 44 and 55.

Figure 16:
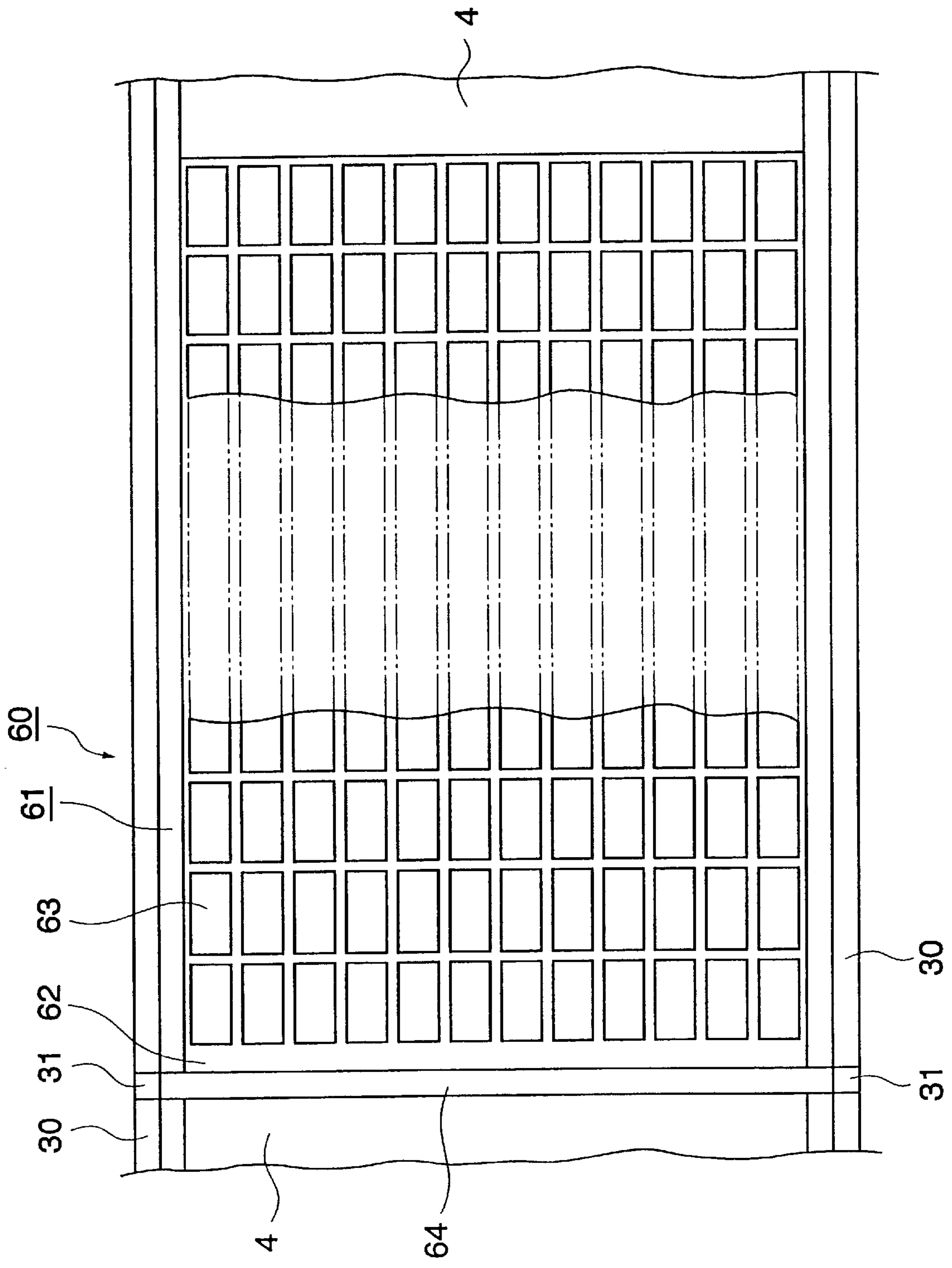
FIG. 16 is a plan view of a modification of the surface pressure applying body of the present invention.
Figure 17:
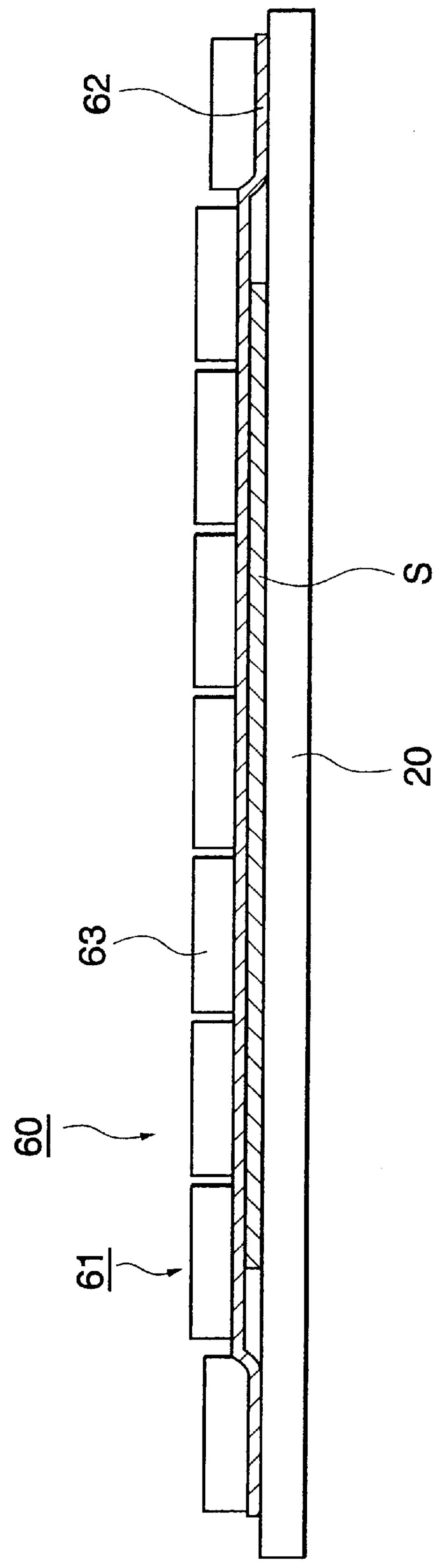
FIG. 17 is a sectional view illustrating a modification of the surface pressure applying body of the present invention.

FIGS. 16 and 17 show an embodiment used in the cooling section 3. FIG. 16 is a top view of a surface pressure applying body, and FIG. 17 is a sectional view thereof in the sheet conveying direction.

Here, a surface pressure applying body 62 is disposed above the corrugated board sheet S so as to face the corrugated board sheet S. The surface pressure applying body 62 covers the entire surface of the corrugated board sheet S. More specifically, the surface pressure applying body 62 is a single surface pressure applying body which has a width that is slightly greater than the maximum design paper width of the corrugated board sheet that is to be produced.

The length, thickness and material of the surface pressure applying body 62 may be basically the same specifications as those of the various types of surface pressure applying bodies described above. However, in regard to the material in particular, it is desirable to use a material that possesses ample softness. With such a material, no non-uniform surface pressure is applied to the corrugated board sheet in the sheet conveying direction, and the surface pressure applying body shows a good fit with the corrugated board sheet S. For example, a cotton-form canvas belt of the same material as the upper conveyor belt, a resin or plastic film, a ceramic material such as carbon, etc., or a metal material such as a steel, copper plate, stainless steel, etc. may be used. A thin material is desirable in all of these materials.

By way of disposing a plurality of weight blocks 63 on the surface pressure applying body 62 in the direction perpendicular to the sheet conveying direction, a load body 61 is obtained.

In the load-applying device 60 constructed with the elements described above, when the corrugated board sheet S passes through the cooling section, the load body 61 applies a load to the upper surface of the corrugated board sheet S. The load body 61 has a plurality of weight blocks 63 disposed in the sheet conveying direction and comprised of a surface pressure applying body 62 that covers the entire surface of the corrugated board sheet S in the direction of width of the sheet S. Since the surface pressure applying body 62 is, as described above, made of a material that has ample softness, the surface pressure applying body 62 shows a good fit with the corrugated board sheet S. Thus, a uniform minimum required load is applied to the entire surface of the corrugated board sheet S. As a result, a corrugated board sheet of uniform quality is produced with a minimum required load that is uniform in the sheet conveying direction being applied.

Figure 18:
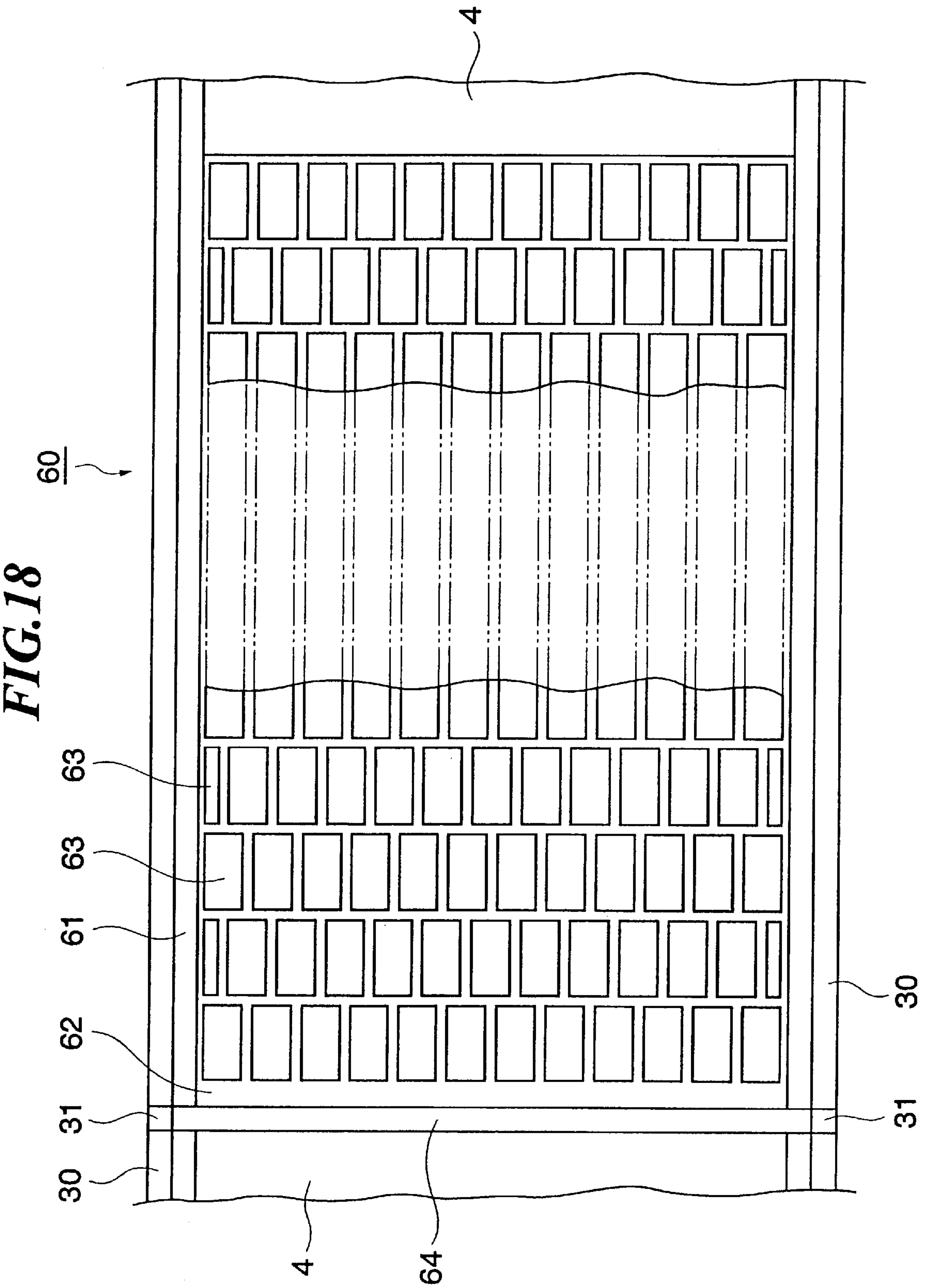
FIG. 18 is a plan view showing a state in which the weight blocks in a modification of the surface pressure applying body are disposed in a staggered configuration.
Figure 19:
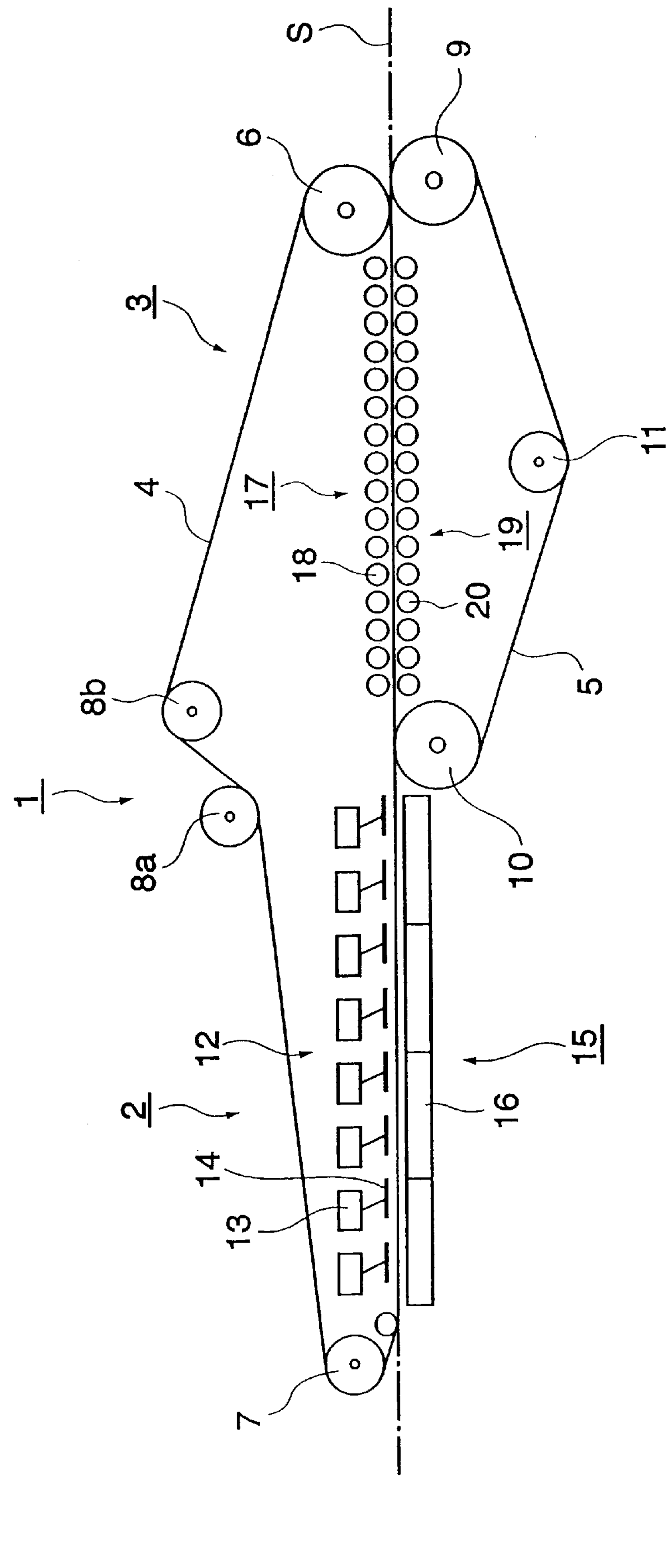
FIG.19 PRIOR ART
FIG. 19 is a side view of a conventional double facer.

Furthermore, since the weight blocks 63 are merely carried on the surface pressure applying body 62 as described above, these weight blocks 63 can be replaced upon necessity. It is also possible to prevent the generation of unloaded regions on the corrugated board sheet S by way of disposing the weight blocks 63 in a staggered pattern in the sheet conveying direction as shown in FIG. 18.

Though not shown, it is possible to install frame bodies that accommodate the weight blocks 63 on the surface pressure applying body 62. Moreover, though likewise not shown, it goes without saying that the embodiment of FIGS. 16 and 17 can be used in a double facer in which an upper conveyor belt is present between the corrugated board sheet S and the surface pressure applying body 62. Furthermore, though FIGS. 16 and 17 illustrate an embodiment used in the cooling section 3, it goes without saying that this embodiment can be used in the heating section 2.

Furthermore, the load-applying device of the present invention that is comprised of the load bodies can be used in both the heating section 2 and cooling section 3 of a double facer 1. This provides a synergistic effect, and a good-quality corrugated board sheet with no crushed corrugations or faulty bonding is realized by means of a simple, low-cost apparatus.

Furthermore, in the load-applying device of the present invention, it is not an essential condition that the respective load bodies apply a load to the corrugated board sheet with an upper conveyor belt in between. For example, in cases where the lower conveyor belt is a suction conveyor of the type disclosed in Japanese Patent Application Laid-Open (Kokai) No. 9-117976, etc., direct loading is possible in which the respective load bodies of the load-applying device contact the corrugated board sheet directly and apply a direct load. Furthermore, the respective load bodies of the load-applying device may also contact the corrugated board sheet directly and apply a direct load in the case of a double facer which does not require an upper conveyor belt in the heating section, either.

As seen from the above, in the load-applying device for a double facer provided by the present invention, the device has a simple structure in which the respective load bodies are simply caused to ride on the upper surface of the corrugated board sheet by the weight of weight blocks. Accordingly, the structure is an extremely simple, and the load-applying device has absolutely no height adjustment device for adjusting the height according to respective flutes of the corrugated board sheet or pressure adjustment device for adjusting the pressure. Consequently, the cost can be reduced. In addition, since the structure is simple, there are no complicated adjustments, maintenance is easy, and the work burden on the operator can be reduced.

The respective load bodies receive the weight of the weight blocks and apply the weight as a surface pressure so that only the load that is required for bonding the corrugated board sheet is applied to the corrugated board sheet. Thus, no concentrated load based on a linear pressure (as seen in the case of weight rolls) is applied to the corrugated board sheet.

Furthermore, even if an upward-pushing force is received from the corrugated board sheet or upper conveyor belt, this force is received as a surface pressure. Thus, there is no vibration, and there is no crushing of the corrugated board sheet due to roll vibration as seen in the case of weight rolls.

In addition, the respective load bodies apply a uniform load under the same conditions in the sheet conveying direction. Thus, there is no non-uniform load balance resulting from the failure to maintain the parallel orientation of rolls (as seen in the case of weight rolls). Accordingly, a corrugated board sheet of uniform quality is produced at a uniform load in the sheet conveying direction.

Since no vibration occurs in the load bodies, noise is not generated. This helps to improve the working environment of the operator as well as the surrounding regional environment.

Furthermore, since the surface pressure applying bodies that carry the weight blocks of the load bodies are constructed with a shape that covers the entire surface of the corrugated board sheet, there is little escape of moisture even if the corrugated board sheet is heated. Thus, warping of the corrugated board sheet tends not to occur.

Furthermore, the load-applying device for a double facer of the present invention has an extremely simple and easy structure. In other words, the device is caused to ride only by the weight of the weight blocks on a stay that is supported on the frame of the double facer via supporting members. Thus, no complicated mechanism is required even compared to conventional pressing devices, etc. The manufacturing cost can be reduced, and there is no need for adjustment of the machinery based on special knowledge or experience.

In addition, setting of the load can be accomplished merely by replacing the weight blocks. Such a setting thus can be simply accomplished with absolutely no need for the replacement of urging elements such as springs, etc. Further, setting of the gap between the pressing device and belt is also not required.

Moreover, the application of a load to the corrugated board sheet is accomplished by a continuous application of a load in the sheet conveying direction by the load bodies instead of the intermittent application of a load by a pressing device, etc. Thus, a good-quality corrugated board sheet that is free of peeling of the sheet can be produced.

What is claimed is:

1. A load-applying device used in a double facer that comprises:

a heating section into which a single-faced corrugated board sheet and a liner sheet are supplied, and glue applied as a coating to crests of corrugations of said single-faced corrugated board sheet is hardened so that said single-faced corrugated board sheet and liner sheet are bonded together, and a cooling section which cools said corrugated board sheet and said liner sheet bonded together in said heating section, wherein said load-applying device is comprised of:

a surface pressure applying body which is disposed above said corrugated board sheet so as to face said corrugated board sheet and which applies a surface pressure to said corrugated board sheet, weight blocks which are carried on top of said surface pressure applying body, and load bodies in which one end of said surface pressure applying body is fastened to said double facer, while another end thereof is caused to ride on said corrugated board sheet in a sheet conveying direction, and wherein a plurality of the load bodies are disposed in a direction perpendicular to said sheet conveying direction.

2. The load-applying device for a double facer according to claim 1, wherein said load bodies are comprised of a plurality of said weight blocks carried on said surface pressure applying body in said sheet conveying direction.

3. The load-applying device for a double facer according to claim 2, wherein said load bodies are comprised of a plurality of weight blocks that are carried on said surface pressure applying body in a direction perpendicular to said sheet conveying direction, said weight blocks being staggered in said sheet conveying direction between an upstream side and a downstream side with respect to said sheet conveying direction.

4. The load-applying device for a double facer according to claim 1, wherein said load bodies are comprised of casings that accommodate said weight blocks and disposed above said surface pressure applying body.

5. The load-applying device for a double facer according to claim 2, wherein said load bodies are comprised of casings that accommodate said weight blocks and disposed above said surface pressure applying body.

6. The load-applying device for a double facer according to claim 3, wherein said load bodies are comprised of casings that accommodate said weight blocks and disposed above said surface pressure applying body.

7. A load-applying device used in a double that comprises:

a heating section into which a single-faced corrugated board sheet and a liner sheet are supplied, and glue applied as a coating to crests of corrugations of said single-faced corrugated board sheet is hardened so that said single-faced corrugated board sheet and liner sheet are bonded together, and a cooling section which cools said corrugated board sheet and said liner sheet bonded together in said heating section, wherein said load-applying device is comprised of:

a surface pressure applying body which is disposed above said single-faced corrugated board sheet and faces said single-faced corrugated board sheet so as to cover an entire surface of said single-faced corrugated board sheet in a direction of width thereof, said surface pressure applying body applying a surface pressure to said single-faced corrugated board sheet, and weight blocks which are carried on said surface pressure applying body, at least two or more of said weight blocks being provided, and wherein one end of said surface pressure applying body is fastened to said double facer, while another end of said surface pressure applying body is caused to ride on said corrugated board sheet in a sheet conveying direction.

8. The load-applying device for a double facer according to claim 7, wherein a plurality of said weight blocks are carried on said surface pressure applying body in said sheet conveying direction.

9. The load-applying device for a double facer according to claim 7, wherein said plurality of weight blocks that are carried on said surface pressure applying body in said sheet conveying direction are provided so as to be staggered in said sheet conveying direction between an upstream side and a downstream side with respect to said sheet conveying direction.

10. A load-applying device used in a double facer that comprises:

a heating section into which a single-faced corrugated board sheet and a liner sheet are supplied, and glue applied as a coating to the corrugation crests of the corrugations of the single-faced corrugated board sheet is hardened so that the single-faced corrugated board sheet and liner sheet are bonded together, and a cooling section which cools the corrugated board sheet bonded in the heating section, wherein said load-applying device is comprised of:

a surface pressure applying body which has connecting sections on upstream side and downstream side thereof, said surface pressure applying body being disposed above said corrugated board sheet so as to face said corrugated board sheet and applying a surface pressure to said corrugated board sheet, weight blocks which are carried on said surface pressure applying body, and load bodies formed in the form of a chain in which a plurality of said surface pressure applying bodies are disposed in a sheet conveying direction and formed into the form of a chain by being connected at said connecting sections, one end of said surface pressure applying bodies formed into the form of chain being fastened to said double facer, while another end of said surface pressure applying bodies formed into the form of chain being caused to ride on said corrugated board sheet in said sheet conveying direction, and wherein a plurality of the load bodies formed into the form of chain are disposed in a direction perpendicular to said sheet conveying direction.

* * * * *

UNITED STATES PATENT AND TRADEMARK OFFICE

CERTIFICATE OF CORRECTION

PATENT NO. : 6,648,042 B2
DATED : November 18, 2003
INVENTOR(S) : Hiroshi Saito et al.

It is certified that error appears in the above-identified patent and that said Letters Patent is hereby corrected as shown below:

Title page,
Item [30], Foreign Application Priority Data, add
-- October 18, 2000 (JP) .......... 2000-318168 --

Signed and Sealed this

Twenty-first Day of June, 2005

JON W. DUDAS
*Director of the United States Patent and Trademark Office*